United States Patent
Lee et al.

(10) Patent No.: US 11,765,467 B2
(45) Date of Patent: Sep. 19, 2023

(54) IMAGE SENSOR, ELECTRONIC DEVICE INCLUDING THE IMAGE SENSOR AND CONFIGURED TO GENERATE OUTPUT IMAGE DATA BASED ON HIGH CONVERSION GAIN PIXEL SIGNALS, AND LOW CONVERSION GAIN PIXEL SIGNALS, AND OPERATING METHOD THEROF

(71) Applicant: Samsung Electronics Co., Ltd., Suwon-si (KR)

(72) Inventors: Jeongguk Lee, Seoul (KR); Yunseok Choi, Seoul (KR); Dochang Ahn, Suwon-si (KR); Soyoung Jeong, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 94 days.

(21) Appl. No.: 17/337,879

(22) Filed: Jun. 3, 2021

(65) Prior Publication Data
US 2021/0385389 A1  Dec. 9, 2021

(30) Foreign Application Priority Data

Jun. 4, 2020 (KR) .................... 10-2020-0067909
Mar. 31, 2021 (KR) .................... 10-2021-0042229

(51) Int. Cl.
H04N 23/76 (2023.01)
H04N 5/265 (2006.01)
(Continued)

(52) U.S. Cl.
CPC ............. *H04N 23/76* (2023.01); *H04N 5/265* (2013.01); *H04N 23/741* (2023.01); *H04N 23/84* (2023.01)

(58) Field of Classification Search
CPC ...... H04N 5/243; H04N 5/2355; H04N 5/265; H04N 9/0451; H04N 5/347;
(Continued)

(56) References Cited

U.S. PATENT DOCUMENTS 7,705,900 B2   4/2010  Guidash
7,728,896 B2*  6/2010  McKee ................ H04N 5/3559
                                                         348/241
(Continued)

FOREIGN PATENT DOCUMENTS

KR      100790583 B1    1/2008

*Primary Examiner* — Chiawei Chen
(74) *Attorney, Agent, or Firm* — Harness Dickey & pierce, P.L.C.

(57) ABSTRACT

Provided is an image sensor including: a pixel array including a plurality of pixel groups each including first pixels to which a first conversion gain is applied and second pixels to which a second conversion gain is applied; a readout circuit configured to receive a first pixel signal corresponding to the first pixels and a second pixel signal corresponding to the second pixels through a single readout with respect to each of the plurality of pixel groups, generate first image data, based on first pixel signals of the plurality of pixel groups, and generate second image data, based on second pixel signals of the plurality of pixel groups; and an image signal processor configured to generate output image data by merging the first image data and the second image data in units of a pixel group.

21 Claims, 13 Drawing Sheets

(51) Int. Cl.
*H04N 23/84* (2023.01)
*H04N 23/741* (2023.01)

(58) Field of Classification Search
CPC .......... H04N 5/35563; H04N 9/04555; H04N 5/345; H04N 23/76; H04N 23/741; H04N 23/84; H04N 25/133; H04N 25/46; H04N 25/585; H04N 25/44
See application file for complete search history.

(56) References Cited

U.S. PATENT DOCUMENTS

| | | |
|---|---|---|
| 8,130,302 B2 | 3/2012 | Johnson |
| 8,456,557 B2 | 6/2013 | Wang et al. |
| 8,749,665 B2 | 6/2014 | Wang et al. |
| 10,645,315 B2 | 5/2020 | Shim et al. |
| 11,438,535 B2* | 9/2022 | Baek ............ H04N 5/359 |
| 2013/0147979 A1* | 6/2013 | McMahon ........ H04N 5/335 |
| | | 348/218.1 |
| 2015/0312491 A1 | 10/2015 | Egawa |
| 2015/0319412 A1* | 11/2015 | Koshiba ........ H04N 25/134 |
| | | 348/246 |
| 2015/0350583 A1* | 12/2015 | Mauritzson ...... H01L 27/14647 |
| | | 257/432 |
| 2016/0353034 A1* | 12/2016 | Mauritzson ........ H04N 9/04557 |
| 2018/0191974 A1* | 7/2018 | Shim ............ H04N 5/35563 |
| 2019/0014277 A1 | 1/2019 | Takane |
| 2019/0158767 A1* | 5/2019 | Wolfs ............ H04N 5/357 |
| 2019/0288020 A1* | 9/2019 | Ikuma ............ H04N 5/35563 |
| 2020/0137325 A1* | 4/2020 | Mori ............ H01L 27/14609 |
| 2020/0162691 A1* | 5/2020 | Mori ............ H01L 27/14627 |
| 2020/0204751 A1* | 6/2020 | Lu ............... H04N 5/37457 |
| 2021/0250529 A1* | 8/2021 | Baek ............ H04N 5/35554 |

\* cited by examiner

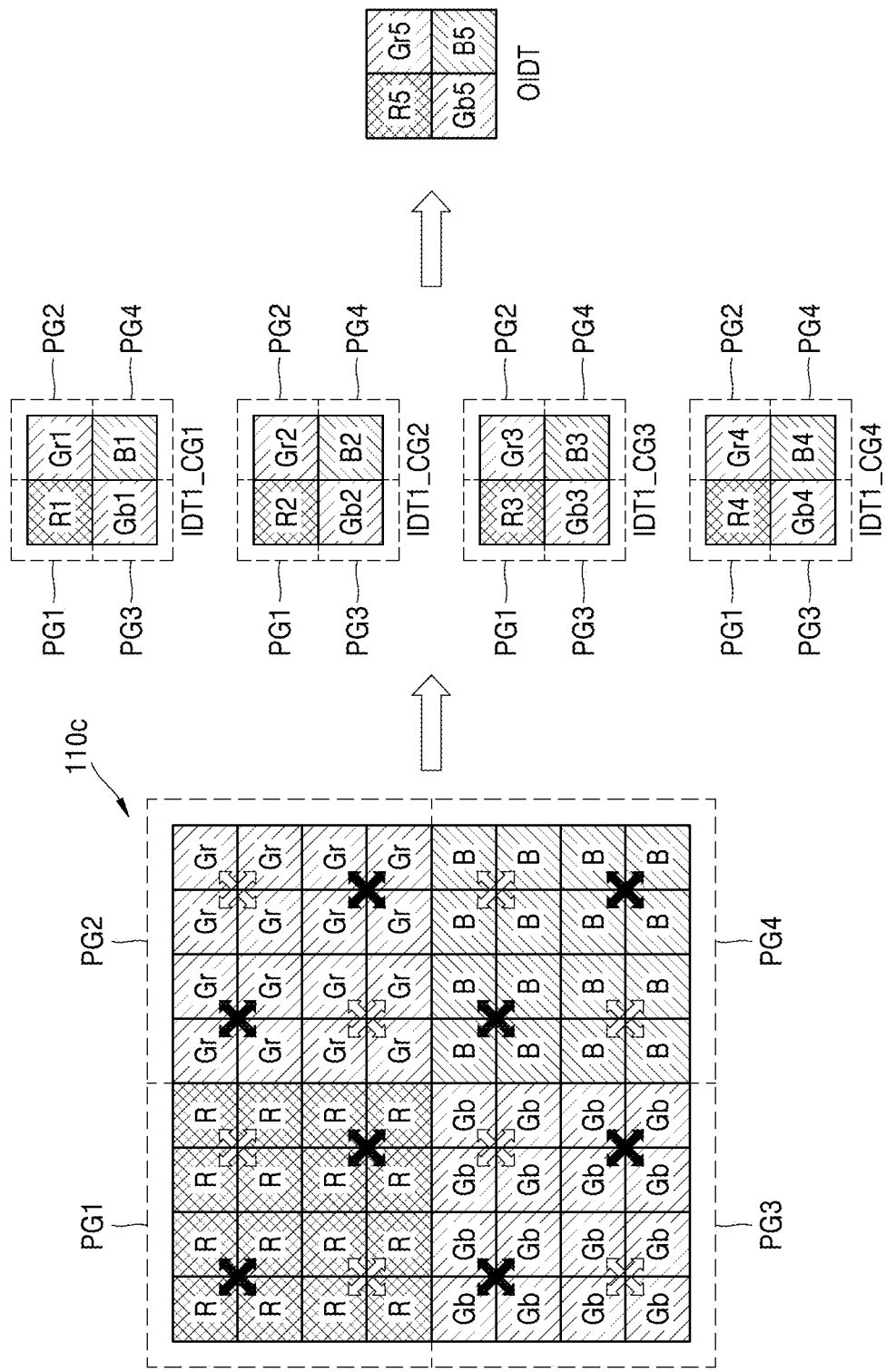

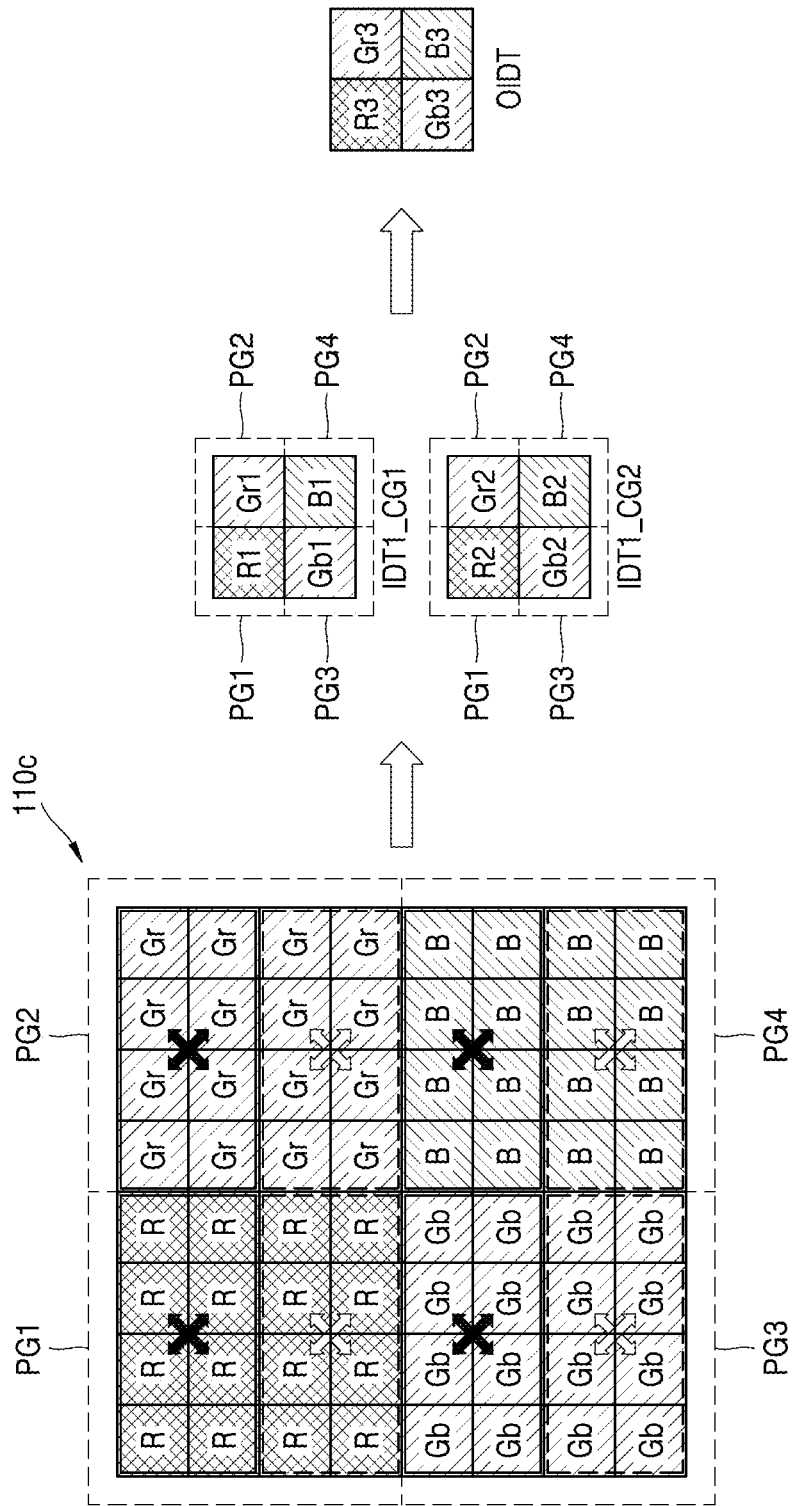

IMAGE SENSOR, ELECTRONIC DEVICE INCLUDING THE IMAGE SENSOR AND CONFIGURED TO GENERATE OUTPUT IMAGE DATA BASED ON HIGH CONVERSION GAIN PIXEL SIGNALS, AND LOW CONVERSION GAIN PIXEL SIGNALS, AND OPERATING METHOD THEROF

CROSS-REFERENCE TO RELATED APPLICATIONS

This application is based on and claims priority under 35 U.S.C. § 119 to Korean Patent Application No. 10-2020-0067909, filed on Jun. 4, 2020 in the Korean Intellectual Property Office, and Korean Patent Application No. 10-2021-0042229, filed on Mar. 31, 2021 in the Korean Intellectual Property Office, the entire contents of each of which are incorporated herein, by reference.

BACKGROUND

At least some example embodiments of the inventive concepts relate to an image sensor, and particularly, to an image sensor for generating image data to which a plurality of conversion gains are applied through a single readout, and an operating method thereof.

An image sensor may sense an image of an object by using a photoelectric conversion element that reacts according to the intensity of light reflected from the object, and generate image data.

In recent years, dual conversion gain (DCG) technology has been applied to realize a high dynamic range (HDR) image of an image sensor. In some example embodiments of DCG technology of the related art, an HDR image is obtained by performing a plurality of readouts to which a high conversion gain (HCG) and a low conversion gain (HCG) are applied. Accordingly, there is a problem in which a frame rate decreases.

SUMMARY

At least some example embodiments of the inventive concepts provide an image sensor for generating image data to which a plurality of conversion gains are applied through a single readout, an electronic device, and an operating method of the image sensor.

According to at least some example embodiments of the inventive concepts, an image sensor includes: a pixel array including a plurality of pixel groups each including first pixels to which a first conversion gain is applied and second pixels to which a second conversion gain is applied are arranged; and a readout circuit configured to receive a first pixel signal corresponding to the first pixels and a second pixel signal corresponding to the second pixels through a single readout with respect to each of the plurality of pixel groups, generate first image data, based on first pixel signals of the plurality of pixel groups, and generate second image data, based on second pixel signals of the plurality of pixel groups; and an image signal processor configured to generate output image data by merging the first image data and the second image data in units of a pixel group.

According to at least some example embodiments of the inventive concepts, an electronic device includes: an image sensor in which a plurality of pixel groups each including a plurality of pixels are arranged and which is configured to generate a plurality of pixel signals corresponding to a plurality of conversion gains through a single readout with respect to each of the plurality of pixel groups, generate plurality of pieces of image data corresponding to the plurality of pixel signals, based on the plurality of pixel signals, and generate output image data by merging the plurality of pieces of image data; and a processor configured to perform image processing on the output image data.

According to at least some example embodiments of the inventive concepts, an operating method of an image sensor includes: outputting a first pixel signal corresponding to first pixels corresponding to a first conversion gain through a single readout from each of a plurality of pixel groups included in a pixel array; outputting a second pixel signal corresponding to second pixels corresponding to a second conversion gain through the single readout from each of the plurality of pixel groups included in the pixel array; generating first image data, based on first pixel signals of the plurality of pixel groups; generating second image data, based on second pixel signals of the plurality of pixel groups; and generating output image data by merging the first image data and the second image data in units of pixel groups.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

FIGS. 6 to 8B are diagrams for explaining methods of generating synthetic image data according to a pattern type of a pixel array;

DETAILED DESCRIPTION OF EXAMPLE EMBODIMENTS

Figure 1:
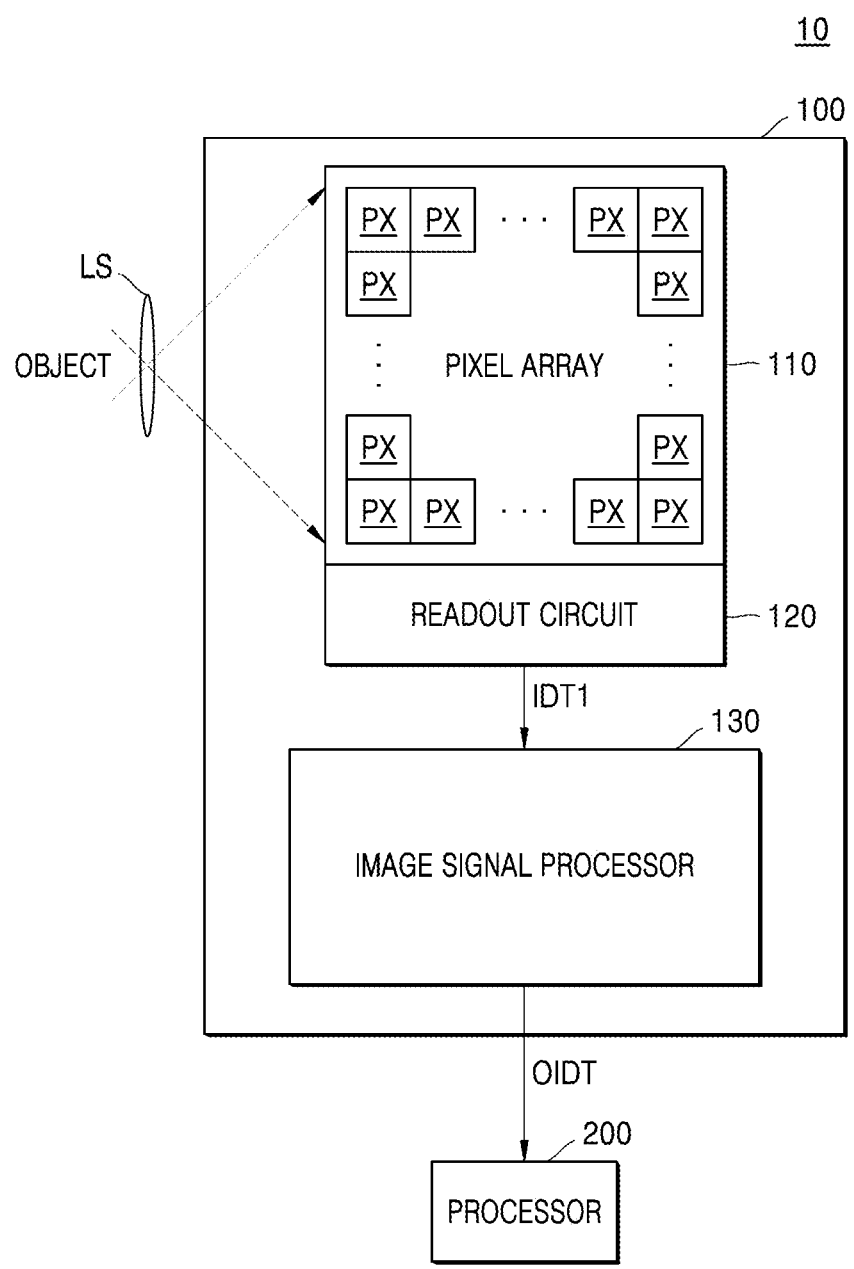
FIG. 1 is a diagram illustrating an image sensor and an electronic device including the same, according to example embodiments of the inventive concepts.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

FIG. 1 is a diagram illustrating an image sensor and an electronic device including the same, according to example embodiments of the inventive concepts.

Referring to FIG. 1, an electronic device 10 may include an image sensor 100 and a processor 200. The image sensor 100 may convert an optical signal of an object, which is incident through an optical lens LW, into image data. The image sensor 100 may be mounted in an electronic device having an image or optical sensing function. For example, the image sensor 100 may be mounted in the electronic device 10, such as a digital still camera, a digital video camera, a smartphone, a wearable device, an Internet-of-Things (IoT) device, a tablet personal computer (PC), a personal digital assistant (PDA), a portable multimedia player (PMP), a navigation device or the like. The image sensor 100 may be also mounted in the electronic device 10 provided as a component of a vehicle, furniture, manufacturing facilities, doors, various measuring devices, and the like. For example, the processor 200 may be an application processor and/or an image processor. Accordingly, the processor 200 may also be referred to, in the present specification, as the image processor 200.

According to at least some example embodiments of the inventive concepts, the image processor 200 may be, or include, hardware including logic circuits; a hardware/software combination executing software; or a combination thereof. For example, the image processor more specifically may include, but is not limited to, one or more of a central processing unit (CPU), a processor core, an arithmetic logic unit (ALU), a digital signal processor, a microcomputer, a field programmable gate array (FPGA), a programmable logic unit, a microprocessor, an application-specific integrated circuit (ASIC), etc. According to at least some example embodiments of the inventive concepts, the image processor 200 may be specifically structured and/or programmed (e.g., via computer-executable program code) to carry out and/or control some or all of the operations described in the present specification as being performed by an image processor or an element thereof.

Referring to FIG. 1, the image sensor 100 may include a pixel array 110, a readout circuit 120, and an image signal processor 130. In example embodiments, the pixel array 110, the readout circuit 120, and the image signal processor 130 may be embodied together as a single semiconductor chip or semiconductor module. In example embodiments, the pixel array 110 and the readout circuit 120 may be embodied together as one semiconductor chip or semiconductor module, and the image signal processor 130 may be embodied as another semiconductor chip or semiconductor module. According to at least some example embodiments of the inventive concepts, the image signal processor 130 may be, or include, hardware including logic circuits; a hardware/software combination executing software; or a combination thereof. For example, the image signal processor 130 more specifically may include, but is not limited to, one or more of a central processing unit (CPU), a processor core, an arithmetic logic unit (ALU), a digital signal processor, a microcomputer, a field programmable gate array (FPGA), a programmable logic unit, a microprocessor, an application-specific integrated circuit (ASIC), etc. According to at least some example embodiments of the inventive concepts, the image signal processor 130 may be specifically structured and/or programmed (e.g., via computer-executable program code) to carry out and/or control some or all of the operations described in the present specification as being performed by a signal processor or an element thereof.

The pixel array 110 may be embodied as a photoelectric conversion element, such as charge-coupled device (CCD) or a complementary metal oxide semiconductor (CMOS), or a variety of photoelectric conversion elements. The pixel array 110 may include a plurality of pixels PX for converting received optical signal (light) into an electrical signal, and the plurality of pixels PX may be arranged in a matrix. The pixel array 110 includes a plurality of row lines and a plurality of column lines connected to the plurality of pixels PX.

Each of the plurality of pixels PX includes an optical sensing element (or a photoelectric conversion element). Examples of the optical sensing element may include a photodiode, a phototransistor, a photogate, a pinned photodiode, a perovskite photodiode, and an organic photodiode, an organic optical conductive film, and the like, or various optical sensing elements may be applied.

The plurality of pixels PX may sense light by the optical sensing element and convert the sensed light into an electrical signal. Each of the plurality of pixels PX may sense light of a certain spectral region. For example, the plurality of pixels may include a pixel for converting light of a red spectrum region (hereinafter referred to as a red pixel) into an electrical signal, a pixel for converting light of a green spectrum region (hereinafter referred to as a green pixel) into an electrical signal, and a pixel for converting light of a blue spectrum region (hereinafter referred to as a blue pixel) into an electrical signal. However, example embodiments of the inventive concepts are not limited thereto, and the plurality of pixels PX may further include a white pixel. As another example, the plurality of pixels PX may include a combination of pixels of different colors, e.g., a yellow pixel, a cyan pixel, a magenta pixel, etc.

A color filter array for transmitting light of a certain spectrum region may be provided on the plurality of pixels PX, and colors to be sensed by the plurality of pixels PX may be determined by color filters on the plurality of pixels PX. However, example embodiments of the inventive concepts are not limited thereto, and in some example embodiments of a certain optical sensing element, light of a certain wavelength band may be converted into an electrical signal according to a level of an electrical signal supplied to the optical sensing element.

A charge generated by the photoelectric conversion element of each of the plurality of pixels PX may be accumulated in a floating diffusion node, and charges accumulated in the diffusion node may be read out by being converted into a voltage. In some example embodiments, a rate at which the charges accumulated in the floating diffusion node is converted into the voltage may be referred to as a conversion gain.

A conversion gain of each of the plurality of pixels PX may vary according to a capacitance of the floating diffusion node. Specifically, the conversion gain may decrease when the capacitance of the floating diffusion node increases and may increase when the capacitance of the floating diffusion node decreases. The conversion gain of each of the plurality of pixels PX may be changed by a conversion gain transistor (not shown) or a capacitor (not shown) connected to the floating diffusion node.

A plurality of conversion gains, e.g., high conversion gain (HCG) and a low conversion gain (LCG), may be applied to the plurality of pixels PX. However, the inventive concepts are not limited thereto, and the plurality of conversion gains applied to the plurality of pixels PX may include three or more conversion gains.

Figure 2:
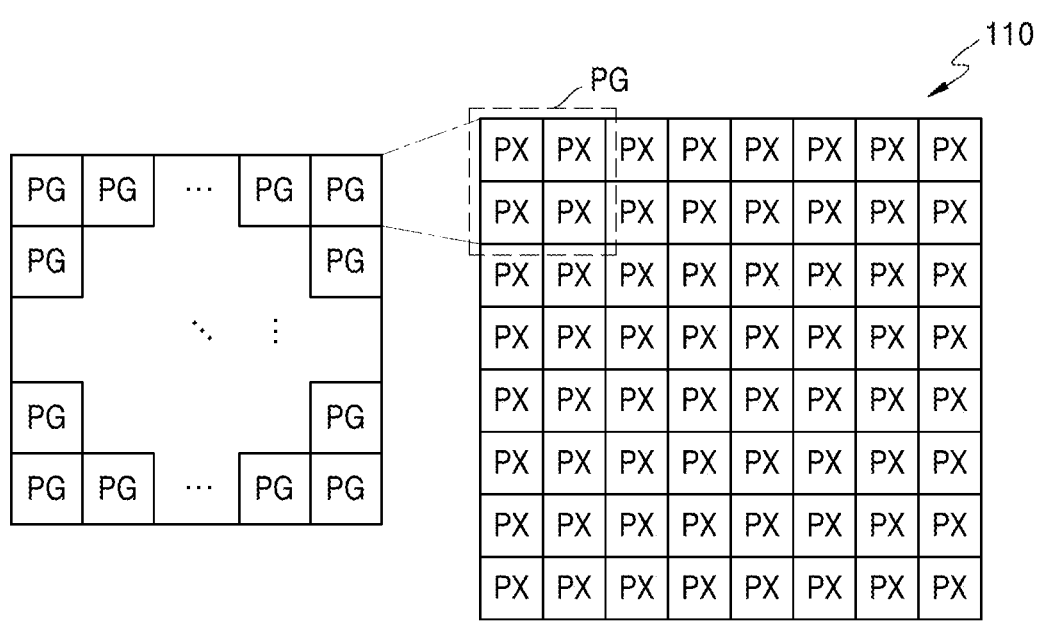
FIG. 2 is a diagram illustrating a pixel array according to example embodiments of the inventive concepts.

FIG. 2 is a diagram illustrating a pixel array according to example embodiments of the inventive concepts.

Referring to FIG. 2, a pixel array 110 may include a plurality of pixel groups PG each including two or more pixels PX adjacent to each other. For example, the pixel array 110 may include a plurality of pixel groups PG each including pixels PX arranged in a 2n×2n matrix (n is a positive integer). Meanwhile, the present disclosure is not limited to the example illustrated in FIG. 2. For example, the pixel array 110 may include a plurality of pixel groups (PG) including the pixels (PX) arranged in the 3N×3N matrix (N is a positive integer).

The plurality of pixel groups PG are basic units, to which a readout method according to example embodiments of the inventive concepts is applied, when the image sensor 100 operates in a first mode in a binning operation is performed, and may correspond to a plurality of binning regions of image data generated based on readout signals. The pixel array 110 may output pixel values of the pixels PX included in each of the plurality of pixel groups PG through a single readout. The pixel values of the pixels PX included in one pixel group during the readout may be summed and output as at least one pixel signal.

In some example embodiments, the pixel array 110 may output a plurality of pixel signals corresponding to a plurality of conversion gains for the plurality of pixel groups PG. In example embodiments, the plurality of pixel groups PG may be divided into a plurality of subgroups corresponding to the plurality of conversion gains, and pixel values of the pixels PX included in each of the plurality of subgroups may be summed and output as a plurality of pixel signals corresponding to the plurality of conversion gains.

For example, when a pixel group PG includes a subgroup corresponding to a high conversion gain HCG and a second subgroup corresponding to a low conversion gain LCG, the pixel array 110 may sum pixel values of the pixels PX included in the first subgroup and output a first pixel signal, and sum pixel values of the pixels PX included in the second subgroup and output a second pixel signal. This will be described in detail with reference to FIGS. 3 and 4 below. According to at least some example embodiments, a high conversion gain HCG is higher than a low conversion gain LCG.

When the image sensor 100 operates in a second mode, e.g., a normal mode in which binning is not performed, the pixel array 110 may read out the plurality of pixel signals of the plurality of pixels PX in units of rows.

The readout circuit 120 may receive pixel signals from the pixel array 110 and convert the pixel signals into digital data, thereby generating image data (which may be referred to as an image). For convenience of explanation, the image data generated by the readout circuit 120 will be referred to as first image data IDT1 below.

For example, in the second mode in which a binning operation is not performed, the readout circuit 120 may generate the first image data IDT1 including pixel values of a plurality of pixels PX, based on pixel signals output from the pixel array 110.

As another example, in the first mode in which the binning operation is performed, the readout circuit 120 may receive a plurality of pixel signals corresponding to a plurality of conversion gains from a plurality of pixel groups PG, and generate a plurality of pieces of first image data IDT1 corresponding to the plurality of conversion gains, based on the plurality of received pixel signals. For example, the readout circuit 120 may generate first image data IDT1 corresponding to a first conversion gain (e.g., a high conversion gain (HCG)), based on a plurality of first pixel signals output from the first subgroups of the plurality of pixel groups PG. The readout circuit 120 may generate first image data IDT1 corresponding to a second conversion gain (e.g., a low conversion gain (HCG)), based on a plurality of second pixel signals output from the second subgroups of the plurality of pixel groups PG.

The image signal processor 130 may perform image processing on the first image data IDt1 output from the readout circuit 120. For example, the image signal processor 130 may perform image processing, such as defective pixel correction, color correction, and image quality improvement, on image data, e.g., the first image data IDT1.

According to example embodiments of the inventive concepts, in the first mode in which the binning operation is performed, the image signal processor 130 may synthesize a plurality of pieces of first image data IDT1 corresponding to a plurality of conversion gains to generate output image data OIDT. In example embodiments, the image signal processor 130 may generate the output image data OIDT by synthesizing the plurality of pieces of first image data IDT1 corresponding to the plurality of conversion gains in units of the pixel groups PG. This will be described in detail with reference to FIG. 5 below.

In addition, the image signal processor 130 may provide image-processed image data, e.g., the output image data OIDT, to the image processor 200 (e.g., an application processor, a main processor of the electronic device 10, a graphical processor, or the like).

Figure 3:
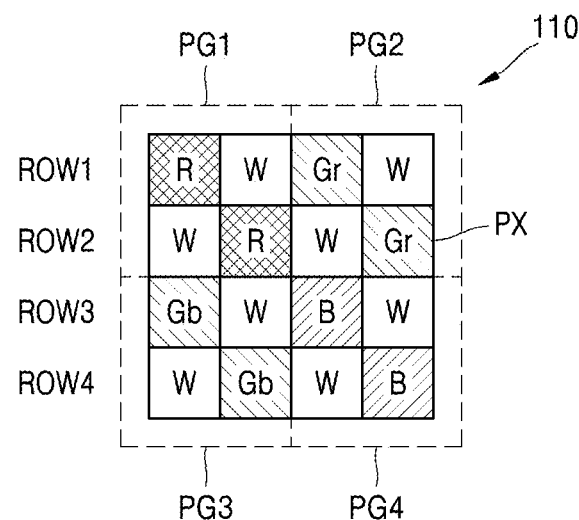
FIG. 3 is a diagram illustrating pixel groups of a pixel array according to example embodiments of the inventive concepts.

FIG. 3 is a diagram illustrating pixel groups of a pixel array according to example embodiments of the inventive concepts. In detail, FIG. 3 is a diagram illustrating pixel groups PG1, PG2, PG3, and PG4 of a pixel array 110 with an RGBW pattern.

Referring to FIG. 3, the pixel array 110 with the RGBW pattern may include a first row ROW1 and a second row ROW2, in which a red pixel R, a white pixel W, a green pixel, e.g., a first green pixel Gr, and a white pixel W are sequentially disposed, and a third row ROW3 and a fourth row ROW4, in which a green pixel, e.g., a second green pixel Gb, a white pixel W, a blue pixel B, and a white pixel W are sequentially disposed. In the RGBW pattern, the white pixels W in the first to fourth rows ROW1 to ROW4 may be disposed in diagonal directions.

The pixel array 110 may include a plurality of pixel groups PG1, PG2, PG3, and PG4 each including four adjacent pixels PX. For example, referring to FIG. 3, the pixel array 110 may include a first pixel group PG1 including two red pixels R and two white pixels W, a second pixel group PG2 including two first green pixels Gr and two white pixels W, a third pixel group PG3 including two second green pixels Gb and two white pixels W, and a third pixel group PG4 including two blue pixels B and two white pixels W. That is, the pixel groups PG1, PG2, PG3, and PG4 may include color pixels of the same color and white pixels.

Pixels PX included in each of the plurality of pixel groups PG1, PG2, PG3, and PG4 may be divided into a plurality of subgroups. In example embodiments, the plurality of pixels PXs included in each of the plurality of pixel groups PG1, PG2, PG3, and PG4 may be divided into a plurality of subgroups depending on whether the plurality of pixels PX are white pixels. The plurality of subgroups may correspond to a plurality of conversion gains.

For example, referring to FIG. 3, among the pixels PX of the first pixel group PG1, the red pixel R other than the white pixel W may be grouped into a first subgroup and the white pixel W may be grouped into a second subgroup. Among the pixels PX of the second pixel group PG2, the first green pixel Gr may be grouped into a first subgroup and the white pixel W may be grouped into a second subgroup. Among the pixels PX of the third pixel group PG3, the second green pixel Gb may be grouped into a first subgroup and the white pixel W may be grouped into a second subgroup. Among the pixels PX of the fourth pixel group PG4, the blue pixel B may be grouped into a first subgroup and the white pixel W may be grouped into a second subgroup. The first subgroups of the plurality of pixel groups PG1, PG2, PG3, and PG4 may correspond to a first conversion gain (e.g., a low conversion gain (LCG)), and the second subgroups thereof may correspond to a second conversion gain (e.g., a high conversion gain (HCG)). The number of conversion gains may be equal to or less than the number of subgroups.

However, the inventive concepts are not limited thereto, and according to example embodiments, a plurality of subgroups may be divided according to the positions of pixels PX of a group. For example, referring to FIG. 3, pixels of a pixel group located in a first diagonal direction may be divided into a first subgroup, and pixels located in a second diagonal direction different from the first diagonal direction may be divided into a second subgroup.

The pixel array 110 may output a pixel signal of the first subgroup and a pixel signal of the second subgroup through a single readout with respect to the plurality of pixel groups PG1, PG2, PG3, and PG4. For example, the pixel array 110 may output a pixel signal of the first subgroup including the red pixel R and a pixel signal of the second subgroup including the white pixel W through a single readout with respect to the first pixel group PG1.

Although FIG. 3 illustrates that the pixel array 110 includes a 4×4 matrix of pixels, the inventive concepts are not limited thereto and the pixel array 110 may include an M×N matrix of pixels (M and N are positive integers). Alternatively, the pixel array 110 may have various patterns, as well as the RGBW pattern. For example, the pixel array 110 may have a RGBY pattern in which a yellow pixel Y disposed instead of the white pixel W.

Figure 4:
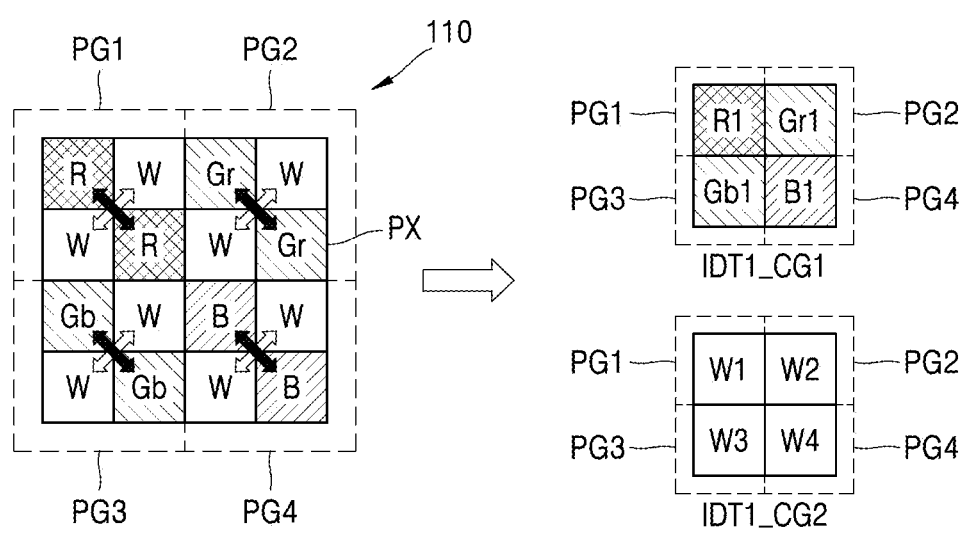
FIG. 4 is a diagram for explaining a readout operation during a binning operation according to example embodiments of the inventive concepts.

FIG. 4 is a diagram for explaining a readout operation during a binning operation according to example embodiments of the inventive concepts. Specifically, FIG. 4 is a diagram for explaining a readout operation of the pixel array 110 of FIG. 3 with respect to pixel groups PG1, PG2, PG3, and PG4.

Referring to FIG. 4, when the image sensor 100 operates in the first mode in which a binning operation is performed, the plurality of pixel groups PG1, PG2, PG3, and PG4 may output pixel signals in units of subgroups. In example embodiments, pixel values of pixels PX included in the same subgroup may be summed and output as one pixel signal in a readout process. For example, referring to FIG. 4, in the readout process, pixel values of red pixels R included in the first subgroup of the first pixel group PG1 may be summed and output as a first pixel signal, and pixel values of white pixels W included in the second subgroup of the first pixel group PG1 may be summed and output as a second pixel signal.

In some example embodiments, in the readout process, a conversion gain corresponding to a subgroup may be applied to pixels PXs included in the subgroup. For example, referring to FIG. 4, when the first subgroup of the first pixel group PG1 corresponds to a first conversion gain (e.g., a low conversion gain), a first pixel signal to which the low conversion gain is applied may be output from the red pixels included in the first subgroup. When the second subgroup of the first pixel group PG1 corresponds to a second conversion gain (e.g., a high conversion gain), a second pixel signal to which the high conversion gain is applied may be output from the white pixels W included in the second subgroup.

As described above, when the image sensor 100 performs the binning operation, a plurality of pixel signals corresponding to a plurality of conversion gains may be output from one pixel group through a single readout.

The readout circuit 120 may generate a plurality of pieces of first image data IDT1_CG1 and IDT1_CG2 corresponding to a plurality of conversion gains, based on a plurality of pixel signals of the plurality of pixel groups PG1, PG2, PG3 and PG4. In example embodiments, the readout circuit 120 may receive first pixel signals from the first subgroups corresponding to the first conversion gain of the plurality of pixel groups PG1, PG2, PG3, and PG4, and generate the first image data IDT1_CG1 corresponding to the first conversion gain, based on the received first pixel signals.

For example, referring to FIG. 4, the readout circuit 120 may receive a first pixel signal from the red pixels R included in the first subgroup of the first pixel group PG1, and calculate a first pixel value R1 corresponding to the first pixel group PG1, based on the received first pixel signal. The readout circuit 120 may receive a first pixel signal from the first green pixels Gr included in the first subgroup of the second pixel group PG2, and calculate a first pixel value Gr1 corresponding to the second pixel group PG2, based on the received first pixel signal. The readout circuit 120 may receive a first pixel signal from the second green pixels Gb included in the first subgroup of the third pixel group PG3, and calculate a first pixel value Gb1 corresponding to the third pixel group PG3, based on the received first pixel signal. The readout circuit 120 may receive a first pixel signal from the blue pixels B included in the first subgroup of the fourth pixel group PG4, and calculate a first pixel value B1 corresponding to the fourth pixel group PG4, based on the received first pixel signal. The readout circuit 120 may generate the first image data IDT1_CG1 corresponding to the first conversion gain, based on the calculated first pixel values R1, Gr1, Gb1, and B1 corresponding to the plurality of pixel groups PG1, PG2, PG3, and PG4.

The readout circuit 120 may receive second pixel signals from the second subgroups corresponding to the second conversion gain of the plurality of pixel groups PG1, PG2, PG3, and PG4, and generate the first image data IDT1_CG2 corresponding to the second conversion gain, based on the received second pixel signals.

For example, referring to FIG. 4, the readout circuit 120 may receive a second pixel signal from the white pixels W included in the second subgroup of the first pixel group PG1, and calculate a first pixel value W1 corresponding to the first pixel group PG1, based on the received second pixel signal. The readout circuit 120 may receive a second pixel signal from the white pixels W included in the second subgroup of the second pixel group PG2, and calculate a second pixel value W2 corresponding to the second pixel group PG2, based on the received second pixel signal. The readout circuit 120 may receive a second pixel signal from the white pixels W included in the second subgroup of the third pixel group PG3, and calculate a second pixel value W3 corresponding to the third pixel group PG3, based on the received second pixel signal. The readout circuit 120 may receive a second pixel signal from the white pixels W included in the second subgroup of the fourth pixel group PG4, and calculate a second pixel value W4 corresponding to the fourth pixel group PG4, based on the received second pixel signal. Thereafter, the readout circuit 120 may generate the first image data IDT1_CG2 corresponding to the second conversion gain, based on the calculated second pixel values W1, W2, W3, and W4 corresponding to the plurality of pixel groups PG1, PG2, PG3, and PG4.

Figure 5:
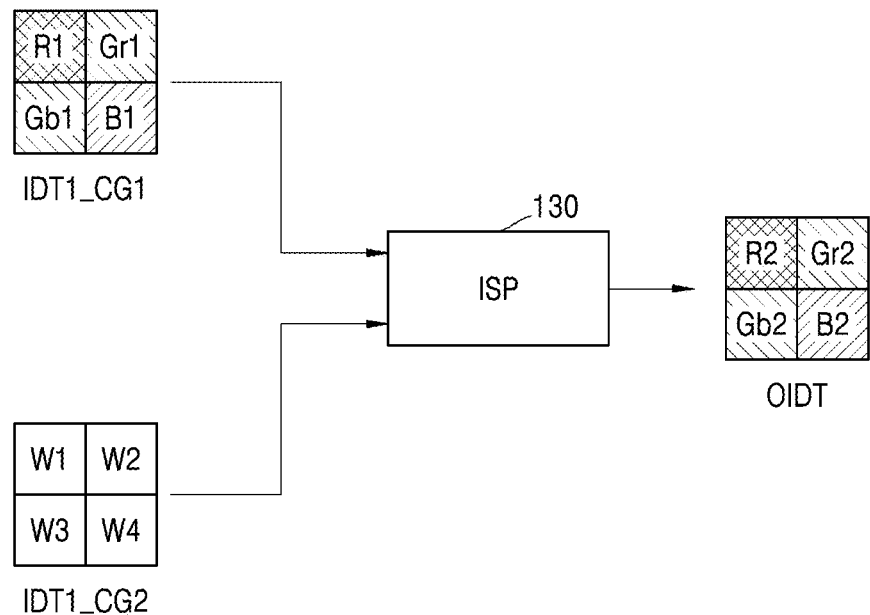
FIG. 5 is a diagram for explaining a method of generating synthetic image data according to example embodiments of the inventive concepts.

FIG. 5 is a diagram for explaining a method of generating synthetic image data according to example embodiments of the inventive concepts. Specifically, FIG. 5 is a diagram for explaining a method of generating output image data OIDT, which is synthetic image data obtained by synthesizing a plurality of pieces of first image data IDT1_CG1 and IDT1_CG2.

Referring to FIG. 5, the readout circuit 120 may transmit the plurality of pieces of first image data IDT1_CG1 and IDT1_CG2 corresponding to a plurality of conversion gains to the image signal processor 130. The image signal processor 130 may generate the output image data ODIT by synthesizing the plurality of pieces of first image data IDT1_CG1 and IDT1_CG2 in units of pixel groups.

For example, the image signal processor 130 may calculate a third pixel value R2 by merging a first pixel value R1 and a second pixel value R2 of the plurality of pieces of first image data IDT1_CG1 and IDT1_CG2, which correspond to a first pixel group PG1. The image signal processor 130 may calculate a third pixel value Gr2 by merging a first pixel value Gr1 and a second pixel value W2 of the plurality of pieces of first image data IDT1_CG1 and IDT1_CG2, which correspond to a second pixel group PG2. The image signal processor 130 may calculate a third pixel value Gb2 by merging a first pixel value Gb1 and a second pixel value W3 of the plurality of pieces of first image data IDT1_CG1 and IDT1_CG2, which correspond to a third pixel group PG3. The image signal processor 130 may calculate a third pixel value B2 by merging a first pixel value B1 and a second pixel value W4 of the plurality of pieces of first image data IDT1_CG1 and IDT1_CG2, which correspond to a fourth pixel group PG4. The image signal processor 130 may generate the output image data OIDT, based on the calculated third pixel values R2, Gr2, Gb2, and B2 corresponding to the plurality of pixel groups PG1, PG2, PG3, and PG4.

As described above, the image sensor 100 according to example embodiments of the inventive concepts may generate a plurality of pieces of image data corresponding to a plurality of conversion gains through a single readout to maintain a high frame rate and generate an image of a rich color range.

Although it is described above with reference to FIGS. 3 to 5 that the pixel array 110 has a RGBW pattern, the inventive concepts are not limited thereto. For example, the inventive concepts are also applicable to example embodiments in which the pixel array 110 has a pattern different from the RGBW pattern. Cases in which the pixel array 110 has a different pattern according to example embodiments of the inventive concepts will be described with reference to FIGS. 6 to 8B below.

FIGS. 6 to 8B are diagrams for explaining methods of generating synthetic image data according to a pattern type of a pixel array. FIGS. 6 to 8B will be described below, in which a description of parts that are the same as those of FIGS. 3 to 5 is omitted.

Figure 6:
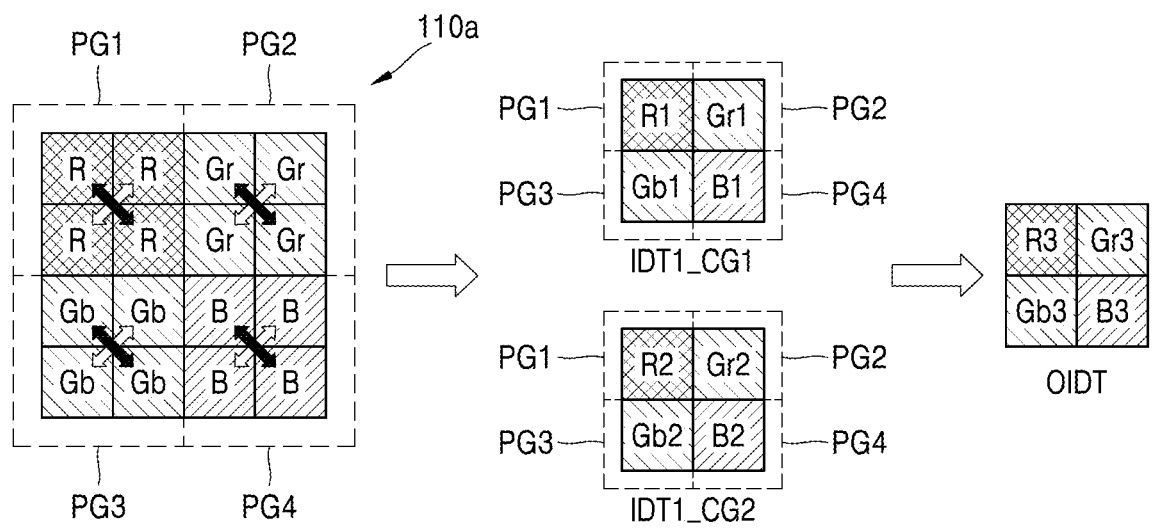

First, FIG. 6 is a diagram for explaining a method of generating synthetic image data when a pixel array 110a has a tetra pattern. Referring to FIG. 6, the pixel array 110a may have a TETRA pattern, in which a red pixel group PG1 including red pixels R arranged in a 2×2 matrix, a first green pixel PG2 including first green pixels Gr arranged in a 2×2 matrix, a second green pixel group PG3 including second green pixels Gb arranged in a 2×2 matrix, and a blue pixel group PG4 including blue pixels B arranged in a 2×2 matrix are repeatedly arranged.

Pixels PX included in each of the pixel groups PG1, PG2, PG3, and PG4 of the pixel array 110a may be divided into a plurality of subgroups. In example embodiments, the plurality of subgroups may be divided according to the positions of the pixels PX in the pixel groups. For example, referring to FIG. 7, in a pixel group, pixels located in a first diagonal direction (e.g., pixels located at an upper left side and a lower right side of the pixel group) may be grouped into a first subgroup, and pixels located in a second diagonal direction different from the first diagonal direction (e.g., pixels located at an upper right side and a lower left side of the pixel group) may be grouped into a second subgroup.

In the pixel array 110a, a first conversion gain may be applied to the pixels PX included in the first subgroup, and a second conversion gain may be applied to the pixels PX included in the second subgroup. The pixel array 110 may output a pixel signal of the first subgroup and a pixel signal of the second subgroup through a single readout with respect to the plurality of pixel groups PG1, PG2, PG3, and PG4. For example, according to at least some example embodiments, multiple conversion gains may be applied in a pixel group through the same single readout operation instead of multiple readout operations.

For example, the pixel array 110a may output a first pixel signal of a first subgroup including red pixels R located in the first diagonal direction and a second pixel signal of a second subgroup including red pixels R located in the second diagonal direction through a single readout with respect to the first pixel group PG1. The pixel array 110a may output pixel signals of the other pixel groups PG2, PG3, and PG4 by the above method.

The readout circuit 120 may generate first image data IDT1_CG1 corresponding to the first conversion gain, based on first pixel signals of the plurality of pixel groups PG1, PG2, PG3 and PG4. For example, the readout circuit 120 may generate the first image data IDT1_CG1 corresponding to the first conversion gain, based on first pixel values R1, Gr1, Gb1, and B1 generated based on the first pixel signals of the plurality of pixel groups PG1, PG2, PG3, and PG4.

In addition, the readout circuit 120 may generate first image data IDT1_CG2 corresponding to the second conversion gain, based on second pixel signals of the plurality of pixel groups PG1, PG2, PG3 and PG4. For example, the readout circuit 120 may generate the first image data IDT1_CG2 corresponding to the second conversion gain, based on second pixel values R2, Gr2, Gb2, and B2 generated based on the second pixel signals of the plurality of pixel groups PG1, PG2, PG3, and PG4.

The image signal processor 130 may generate output image data ODIT by synthesizing the first image data IDT1_CG1 and IDT1_CG2 in units of pixel groups. For example, the image signal processor 130 may generate output image data OIDT including third pixel values R3, Gr3, Gb3 and B3 by synthesizing the first image data IDT1_CG1 and IDT1_CG2 in units of the plurality of pixel groups PG1, PG2, PG3, and PG4.

Figure 7:
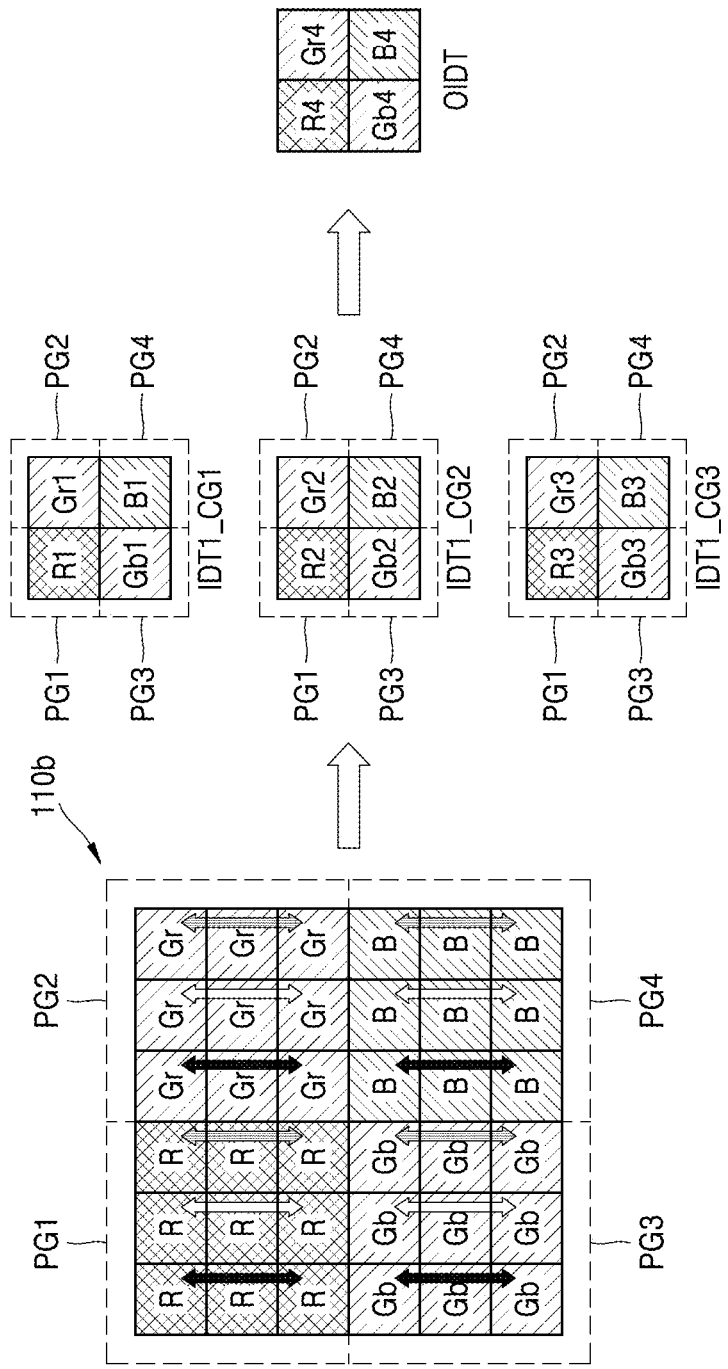

FIG. 7 is a diagram for explaining a method of generating synthetic image data when a pixel array 110b has a Nona pattern. Referring to FIG. 6, the pixel array 110a may have a NONA pattern, in which a red pixel group PG1 including red pixels R arranged in a 3×3 matrix, a first green pixel PG2 including first green pixels Gr arranged in a 3×3 matrix, a second green pixel group PG3 including second green pixels Gb arranged in a 3×3 matrix, and a blue pixel group PG4 including blue pixels B arranged in a 3×3 matrix are repeatedly arranged.

Pixels PX included in each of the pixel groups PG1, PG2, PG3, and PG4 of the pixel array 110b may be divided into a plurality of subgroups. In example embodiments, the plurality of subgroups may be divided according to the positions of the pixels PX in the pixel groups.

For example, referring to FIG. 7, in a pixel group, pixels located in a first column may be divided into a first subgroup, pixels located in a second column may be divided into a second subgroup, and pixels located in a third column may be divided into a third subgroup. However, the inventive concepts are not limited thereto, and for example, in a pixel group, pixels located in a first row may be divided into a first subgroup, pixels located in a second row may be divided into a second subgroup, and pixels located in a third row may be divided into a third subgroup.

In the pixel array 110b, a first conversion gain may be applied to the pixels PX included in the first subgroup, a second conversion gain may be applied to the pixels PX included in the second subgroup, and a third conversion gain may be applied to the pixels PX included in the third subgroup. The first to third conversion gains may be the same or different from each other. The pixel array 110 may output pixel signals of the first subgroup, the second subgroup, and the third subgroup through a single readout with respect to the plurality of pixel groups PG1, PG2, PG3, and PG4.

For example, the pixel array 110b may output a first pixel signal of a first subgroup including red pixels R located in the first column, a second pixel signal of a second subgroup including red pixels R located in the second column, and a third pixel signal of a third subgroup including red pixels R located in the third column. The pixel array 110b may output pixel signals of the other pixel groups PG2, PG3, and PG4 by the above method.

The readout circuit 120 may generate first image data IDT1_CG1 corresponding to the first conversion gain, based on first pixel signals of the plurality of pixel groups PG1, PG2, PG3 and PG4. For example, the readout circuit 120 may generate the first image data IDT1_CG1 corresponding to the first conversion gain, based on first pixel values R1, Gr1, Gb1, and B1 generated based on the first pixel signals of the plurality of pixel groups PG1, PG2, PG3, and PG4.

In addition, the readout circuit 120 may generate first image data IDT1_CG2 corresponding to the second conversion gain, based on second pixel signals of the plurality of pixel groups PG1, PG2, PG3 and PG4. For example, the readout circuit 120 may generate the first image data IDT1_CG2 corresponding to the second conversion gain, based on second pixel values R2, Gr2, Gb2, and B2 generated based on the second pixel signals of the plurality of pixel groups PG1, PG2, PG3, and PG4.

In addition, the readout circuit 120 may generate first image data IDT1_CG3 corresponding to the third conversion gain, based on third pixel signals of the plurality of pixel groups PG1, PG2, PG3 and PG4. For example, the readout circuit 120 may generate the first image data IDT1_CG3 corresponding to the third conversion gain, based on third pixel values R3, Gr3, Gb3, and B3 generated based on the third pixel signals of the plurality of pixel groups PG1, PG2, PG3, and PG4.

The image signal processor 130 may generate output image data ODIT by synthesizing the first image data IDT1_CG1, IDT1_CG2, and IDT1_CG3 in units of pixel groups. In example embodiments, the image signal processor 130 may generate output image data OIDT including fourth pixel values R4, Gr4, Gb4 and B4 by synthesizing the first image data IDT1_CG1, IDT1_CG2, and IDT1_CG3 in units of the plurality of pixel groups PG1, PG2, PG3, and PG4.

For example, the image signal processor 130 may calculate the fourth pixel value R4 corresponding to the first pixel group PG1, based on the pixel values R1, R2, and R3 of the first image data IDT1_CG1, IDT1_CG2, and IDT1_CG3, which correspond to the first pixel group PG1. In this manner, the image signal processor 130 may calculate the fourth pixel values Gr4, Gb4, and B4 corresponding to the other pixel groups PG2, PG3, and PG4. Thereafter, the image signal processor 130 may generate the output image data OIDT, based on the fourth pixel values R4, Gr4, Gb4, and B4.

FIGS. 8A and 8B are diagrams for explaining methods of generating synthetic image data when a pixel array 110c has a hexadeca pattern. Referring to FIGS. 8A and 8B, the pixel array 110a may have a HEXADECA pattern, in which a red pixel group PG1 including red pixels R arranged in a 4×4 matrix, a first green pixel PG2 including first green pixels Gr arranged in a 4×4 matrix, a second green pixel group PG3 including second green pixels Gb arranged in a 4×4 matrix, and a blue pixel group PG4 including blue pixels B arranged in a 4×4 matrix are repeatedly arranged.

Pixels PX included in each of the plurality of pixel groups PG1, PG2, PG3, and PG4 of the pixel array 110c may be divided into a plurality of subgroups. In example embodiments, the plurality of subgroups may be divided according to the positions of the pixels PX in the pixel groups.

For example, referring to FIG. 8A, each of the plurality of pixel groups PG1, PG2, PG3, and PG4 may be divided into four subgroups. Specifically, among the pixels included in the plurality of pixel groups PG1, PG2, PG3, and PG4, upper left four pixels may be grouped into a first subgroup, upper right four pixels may be grouped into a second subgroup, lower left four pixels may be grouped into a third subgroup, and lower right four pixels may be grouped into a fourth subgroup. However, the inventive concepts are not limited thereto, and for example, in a pixel group, pixels located in a first row (first column) may be grouped into a first subgroup, pixels located in a second row (second column) may be grouped into a second subgroup, pixels located in a third row (third column) may be grouped into a third subgroup, and pixels located in a fourth row (fourth column) may be grouped into a fourth subgroup.

In the pixel array 110c, a first conversion gain may be applied to the pixels PX included in the first subgroup, a second conversion gain may be applied to the pixels PX included in the second subgroup, a third conversion gain may be applied to the pixels PX included in the third subgroup, and a fourth conversion gain may be applied to the pixels PX included in the fourth subgroup. The first to fourth conversion gains may be the same or different from each other. The pixel array 110s may output pixel signals of the first subgroup, the second subgroup, the third subgroup, and the fourth subgroup through a single readout with respect to the plurality of pixel groups PG1, PG2, PG3, and PG4.

For example, referring to FIG. 8A, the pixel array 110c may output a first pixel signal of the first subgroup including upper left red pixels R, a second pixel signal of the second subgroup including upper right red pixels R, a third pixel signal of the third subgroup including lower left red pixels R, and a fourth pixel signal of the fourth subgroup including lower right red pixels R through a single readout with respect to the first pixel group PG1. The pixel array 110c may output pixel signals of the other pixel groups PG2, PG3, and PG4 by the above method.

The readout circuit 120 may generate first image data IDT1_CG1 corresponding to the first conversion gain, based on the first pixel signals of the plurality of pixel groups PG1, PG2, PG3 and PG4. For example, the readout circuit 120 may generate the first image data IDT1_CG1 corresponding to the first conversion gain, based on first pixel values R1, Gr1, Gb1, and B1 generated based on the first pixel signals of the first subgroups of the plurality of pixel groups PG1, PG2, PG3, and PG4.

In addition, the readout circuit 120 may generate second image data IDT1_CG2 corresponding to the second conversion gain, based on the second pixel signals of the plurality of pixel groups PG1, PG2, PG3 and PG4. For example, the readout circuit 120 may generate the first image data IDT1_CG2 corresponding to the second conversion gain, based on second pixel values R2, Gr2, Gb2, and B2 generated based on the second pixel signals of the second subgroups of the plurality of pixel groups PG1, PG2, PG3, and PG4.

The readout circuit 120 may generate first image data IDT1_CG3 corresponding to the third conversion gain, based on the third pixel signals of the plurality of pixel groups PG1, PG2, PG3 and PG4. For example, the readout circuit 120 may generate the first image data IDT1_CG3 corresponding to the third conversion gain, based on third pixel values R3, Gr3, Gb3, and B3 generated based on the third pixel signals of the third subgroups of the plurality of pixel groups PG1, PG2, PG3, and PG4.

The readout circuit 120 may generate first image data IDT1_CG4 corresponding to the fourth conversion gain, based on the fourth pixel signals of the plurality of pixel groups PG1, PG2, PG3 and PG4. For example, the readout circuit 120 may generate the first image data IDT1_CG4 corresponding to the fourth conversion gain, based on fourth pixel values R4, Gr4, Gb4, and B4 generated based on the fourth pixel signals of the fourth subgroups of the plurality of pixel groups PG1, PG2, PG3, and PG4.

The image signal processor 130 may generate output image data ODIT by synthesizing the first image data IDT1_CG1, IDT1_CG2, IDT1_CG3, and IDT1_CG4 in units of pixel groups. In example embodiments, the image signal processor 130 may generate output image data OIDT including fifth pixel values R5, Gr5, Gb5 and B5 by synthesizing the first image data IDT1_CG1, IDT1_CG2, IDT1_CG3, and IDT1_CG4 in units of the plurality of pixel groups PG1, PG2, PG3, and PG4.

For example, the image signal processor 130 may calculate the fifth pixel value R5 corresponding to the first pixel group PG1, based on the pixel values R1, R2, R3, and R4 of the first image data IDT1_CG1, IDT1_CG2, IDT1_CG3, and IDT1_CG4, which correspond to the first pixel group PG1. In this manner, the image signal processor 130 may calculate the fifth pixel values Gr5, Gb5, and B5 corresponding to the other pixel groups PG2, PG3, and PG4. Thereafter, the image signal processor 130 may generate the output image data OIDT, based on the fifth pixel values R5, Gr5, Gb5, and B5.

For example, referring to FIG. 8A, each of the plurality of pixel groups PG1, PG2, PG3, and PG4 may be divided into two subgroups. Specifically, among pixels included in each of the plurality of pixel groups PG1, PG2, PG3 and PG4, eight upper pixels may be grouped into a first subgroup and eight lower pixels may be grouped into a second subgroup. However, the inventive concepts are not limited thereto, and for example, among the pixel groups, left pixels may be grouped into a first subgroup and right pixels may be grouped into a second subgroup.

In the pixel array 110c, a first conversion gain may be applied to pixels PX included in the first subgroup and a second conversion gain may be applied to pixels PX included in the second subgroup. The first and second conversion gains may be the same or different from each other. The pixel array 110 may output pixel signals of the first subgroup and the second subgroup through a single readout with respect to the plurality of pixel groups PG1, PG2, PG3, and PG4.

For example, referring to FIGS. 8B, the pixel array 110a may output a first pixel signal of a first subgroup including upper red pixels R and a second pixel signal of a second subgroup including lower red pixels R through a single readout with respect to the first pixel group PG1. The pixel array 110c may output pixel signals of the other pixel groups PG2, PG3, and PG4 by the above method.

The readout circuit 120 may generate first image data IDT1_CG1 corresponding to the first conversion gain, based on the first pixel signals of the plurality of pixel groups PG1, PG2, PG3 and PG4. For example, the readout circuit 120 may generate the first image data IDT1_CG1 corresponding to the first conversion gain, based on first pixel values R1, Gr1, Gb1, and B1 generated based on the first pixel signals of the first subgroups of the plurality of pixel groups PG1, PG2, PG3, and PG4.

In addition, the readout circuit 120 may generate second image data IDT1_CG2 corresponding to the second conversion gain, based on the second pixel signals of the plurality of pixel groups PG1, PG2, PG3 and PG4. For example, the readout circuit 120 may generate the first image data IDT1_CG2 corresponding to the second conversion gain, based on second pixel values R2, Gr2, Gb2, and B2 generated based on the second pixel signals of the second subgroups of the plurality of pixel groups PG1, PG2, PG3, and PG4.

The image signal processor 130 may generate output image data ODIT by synthesizing the first image data IDT1_CG1 and IDT1_CG2 in units of pixel groups. In example embodiments, the image signal processor 130 may generate output image data OIDT including third pixel values R3, Gr3, Gb3 and B3 by synthesizing the first image data IDT1_CG1 and IDT1_CG2 in units of the plurality of pixel groups PG1, PG2, PG3, and PG4.

For example, referring to FIG. 8B, the image signal processor 130 may calculate the third pixel value R3 corresponding to the first pixel group PG1, based on the pixel values R1 and R2 of the first image data IDT1_CG1 and IDT1_CG2, which correspond to the first pixel group PG1. In this manner, the image signal processor 130 may calculate the third pixel values Gr3, Gb3, and B3 corresponding to the other pixel groups PG2, PG3, and PG4. In addition, the image signal processor 130 may generate the output image data OIDT, based on the third pixel values R3, Gr3, Gb3, and B3.

Figure 9:
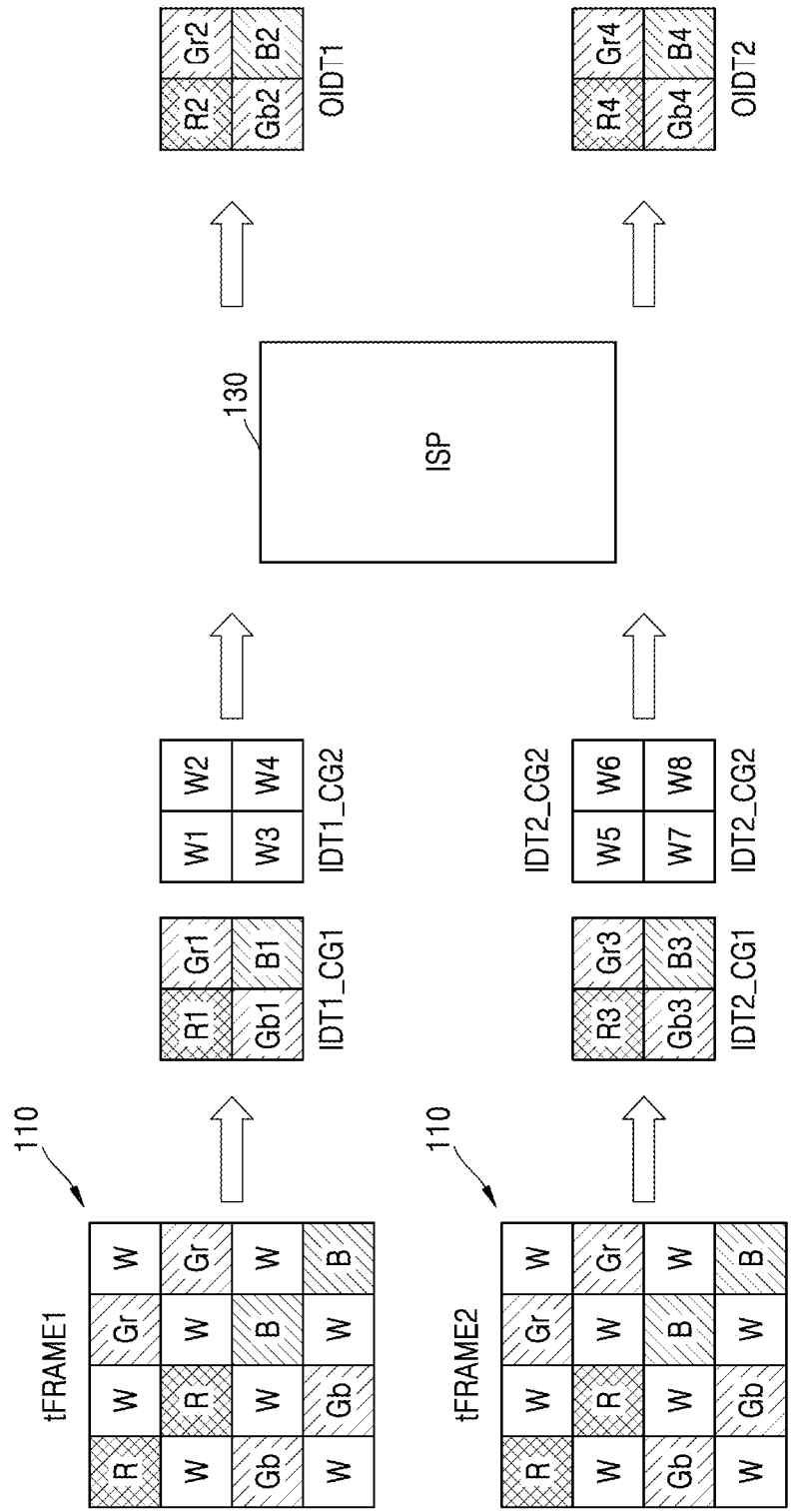
FIGS. 9 and 10 are diagrams illustrating methods of generating multi-frame high dynamic range (HDR) image data according to example embodiments of the inventive concepts.
Figure 10:
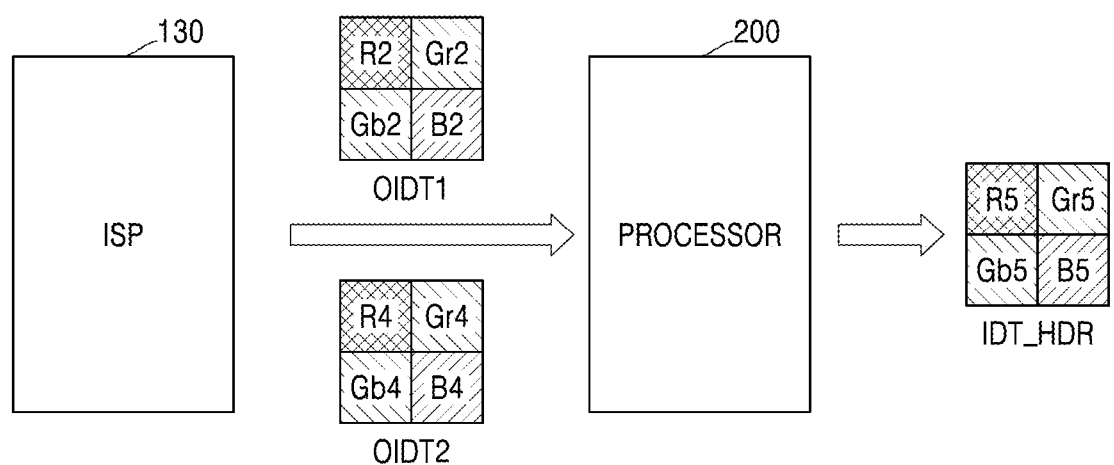

FIGS. 9 and 10 are diagrams illustrating methods of generating a multi-frame high dynamic range (HDR) image data according to example embodiments of the inventive concepts. Although for convenience of explanation, it is assumed that a pixel array 110 has an RGBW pattern, the inventive concepts are not limited thereto, and the following description may substantially apply to example embodiments in which the pixel array 110 has an RGBY pattern, a tetra pattern, a Nona pattern, or a hexadeca pattern. FIGS. 9 and 10 will be described below, in which a description of parts that are the same as those of FIGS. 3 to 8 is omitted.

Referring to FIG. 9, the electronic device 10 of FIG. 1 may generate a plurality of pieces of synthetic image data (e.g., the output image data of FIG. 5) with respect to each of a plurality of frame sections by the method described above with reference to FIGS. 3 to 8. The electronic device 10 may generate a multi-frame HDR image by synthesizing the plurality of pieces of generated synthetic image data.

In example embodiments, the image sensor 100 may generate first image data IDT1_CG1 corresponding to a first gain and first image data IDT1_CG2 corresponding to a second conversion gain in a first frame section tFRAME1 corresponding to first exposure by the method described above with reference to FIGS. 3 to 8. The image signal processor 130 of the image sensor 100 may generate first output image data OIDT1 by merging the first image data IDT1_CG1 and IDT1_CG2 corresponding to the first frame section tFRAME1 by the method described above with reference to FIGS. 3 to 8.

The image sensor 100 may generate second image data IDT2_CG1 corresponding to the first gain and second image data IDT2_CG2 corresponding to the second conversion gain in a second frame section tFRAME2 corresponding to second exposure by the method described above with reference to FIGS. 3 to 8. The second exposure may have a different exposure period than that of the first exposure. The image signal processor 130 of the image sensor 100 may generate second output image data OIDT2 by merging the second image data IDT2_CG1 and IDT2_CG2 corresponding to the second frame section tFRAME2 by the method described above with reference to FIGS. 3 to 8.

Referring to FIG. 10, the image signal processor 130 may provide the first output image data OIDT1 and the second output image data OIDT2 to the processor 200. The processor 200 may generate synthetic image data IDT_HDR by merging the first output image data OIDT1 and the second output image data OIDT2 in units of pixel groups.

For example, the processor 200 may calculate a first pixel value R5 of the synthetic image data IDT_HDR, based on pixel values R2 and R4 of the first output image data OIDT1 and the second output image data OIDT2, which correspond to the first pixel group. In this way, the processor 200 may calculate the other pixel values Gr5, Gb5 and B5 of the synthetic image data IDT_HDR, based on pixel values of the first output image data OIDT1 and the second output image data OIDT2, which correspond to the other pixel groups.

As described above, the electronic device 10 according to example embodiments of the inventive concepts may generate multi-frame HDR image data by using a plurality of pieces of output image data corresponding to each of a plurality of frame sections by the above method, thereby significantly increasing a range of colors.

Although it is described above with reference to FIGS. 9 and 10 that the electronic device 10 generates multi-frame HDR image data by using two pieces of output image data corresponding to two frame sections, the inventive concepts are not limited thereto and multi-frame HDR image data may be generated using three pieces of output image data corresponding to three or more frame sections.

Figure 11:
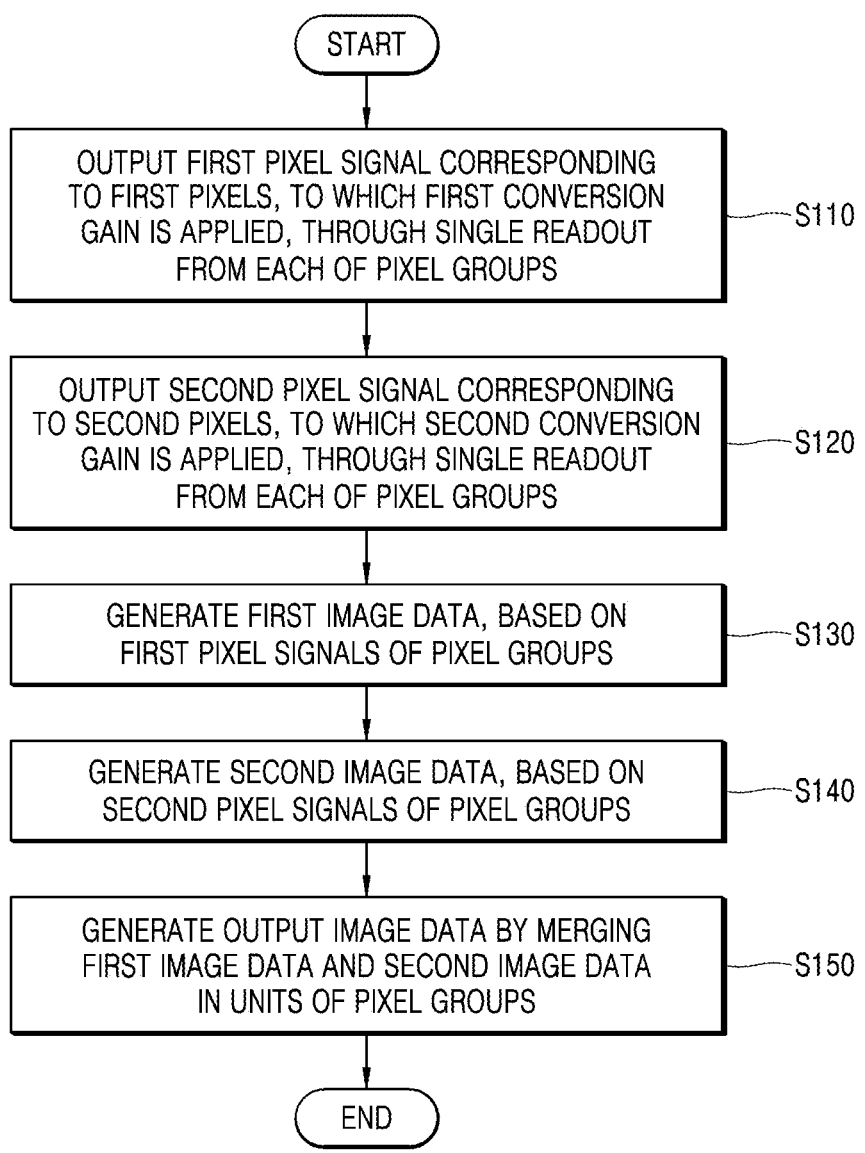
FIG. 11 is a flowchart of an operating method of an image sensor according to example embodiments of the inventive concepts.

FIG. 11 is a flowchart of an operating method of an image sensor according to example embodiments of the inventive concepts. Specifically, FIG. 11 is a flowchart of an operating method of the image sensor 100 of FIG. 1.

Referring to FIG. 11, the image sensor 100 may output a first pixel signal corresponding to first pixels, to which a first conversion gain is applied, through a single readout from each of a plurality of pixel groups included in a pixel array (S110). Specifically, the image sensor 100 may output a first pixel signal by summing first pixel values of first pixels of each of the plurality of pixel groups.

Next, the image sensor 100 may output a second pixel signal corresponding to second pixels, to which a second conversion gain is applied, through the single readout from each of the plurality of pixel groups included in the pixel array (S120). Specifically, the image sensor 100 may output a second pixel signal by summing second pixel values of second pixels of each of the plurality of pixel groups.

According to at least some example embodiments of the inventive concepts, steps S110 and S120 may be performed simultaneously such that the first pixel signal and the second pixel signal are both output through the same single readout operation. Thus, according to at least some example embodiments of the inventive concepts, the same single readout operation may be used to output at least two different pixel signals that correspond, respectively, to at least two different conversion gains. For example, the first pixel signal corresponding to first pixels, to which a first conversion gain is applied and second pixel signal corresponding to second pixels, to which a second conversion gain is applied may both be output by the same single readout operation.

The image sensor 100 may generate first image data, based on first pixel signals of the plurality of pixel groups (S130). The image sensor 100 may generate second image data, based on second pixel signals of the plurality of pixel groups (S140). Thereafter, the image sensor 100 may generate output image data by merging the first image data and the second image data in units of the pixel groups (S150).

Figure 12:
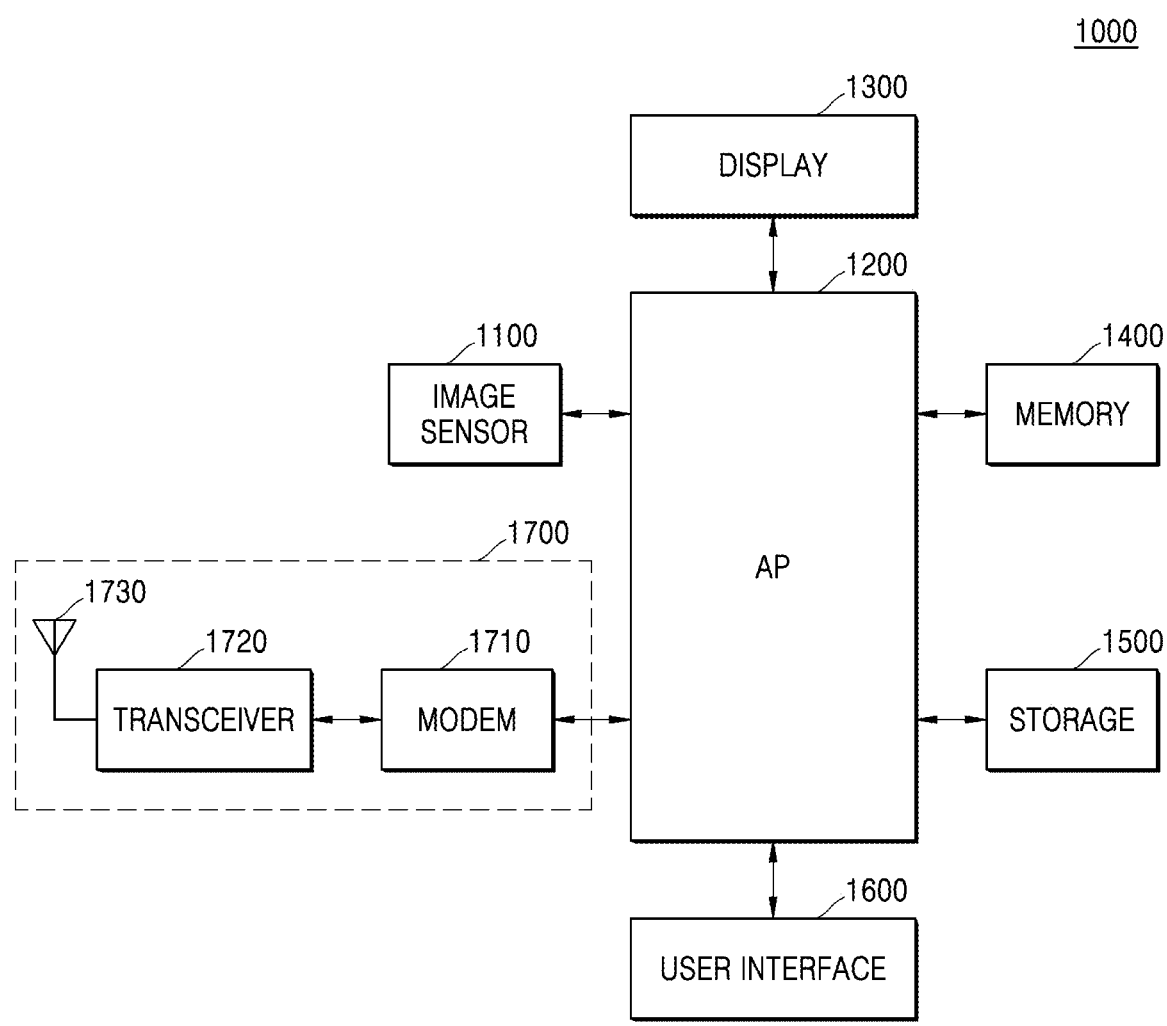
FIG. 12 is a diagram illustrating an electronic device according to example embodiments of the inventive concepts.

FIG. 12 is a diagram illustrating an electronic device according to example embodiments of the inventive concepts.

Referring to FIG. 12, an electronic device 1000 may include an image sensor 1100, an application processor 1200, a display 1300, a memory 1400, a storage 1500, a user interface 1600, and a wireless transceiver 1700. The image sensor 1100 of FIG. 12 may correspond to the image sensor 100 of FIG. 1, and the application processor 1200 of FIG. 14 may correspond to the processor 200 of FIG. 1. A description of parts that are the same as those of FIG. 1 will be omitted.

The application processor 1200 may control overall operations of the electronic device 1000, and may be provided in the form of a system-on-chip (SoC) for driving an application program, an operating system, and the like.

The memory 1400 may store programs and/or data to be processed or executed by the application processor 1200. The storage 1500 may be embodied as a non-volatile memory device such as NAND flash or resistive memory, and may be provided, for example, in the form of a memory card (MMC, eMMC, SD, or micro SD) or the like. The storage 1500 may store data regarding an execution algorithm for control of an image processing operation of the application processor 1200 and/or a program, and when the image processing operation is performed, the data and/or the program may be loaded to the memory 1400.

The user interface 1600 may be embodied as various types of devices capable of receiving a user input, such as a keyboard, a curtain key panel, a touch panel, a fingerprint sensor, or a microphone. The user interface 1600 may receive a user input and provide a signal corresponding to the received user input to the application processor 1200. The wireless transceiver 1700 may include a modem 1710, a transceiver 1720, and an antenna 1730.

Figure 13:
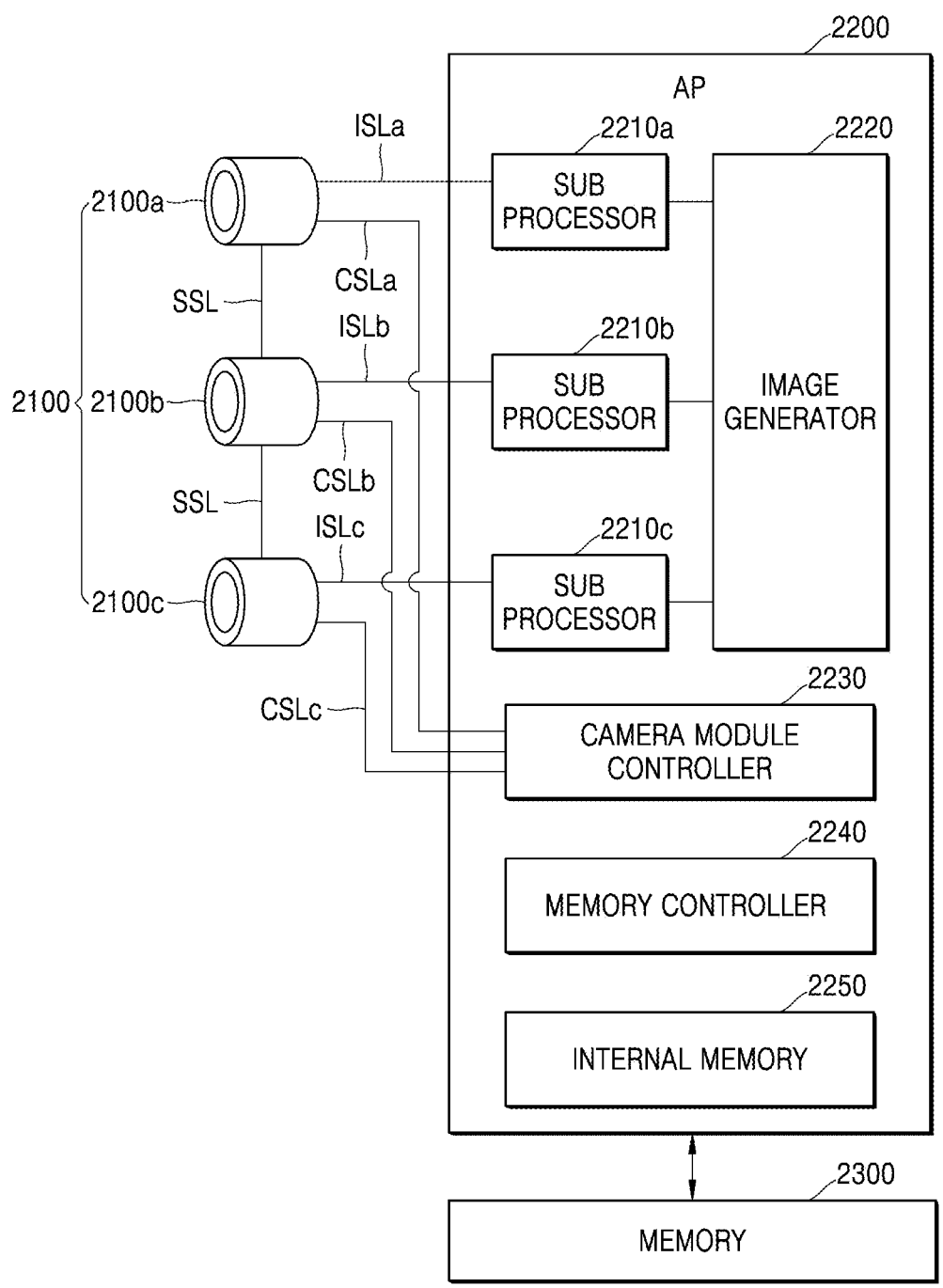
FIG. 13 is a diagram illustrating part of an electronic device according to example embodiments of the inventive concepts.
Figure 14:
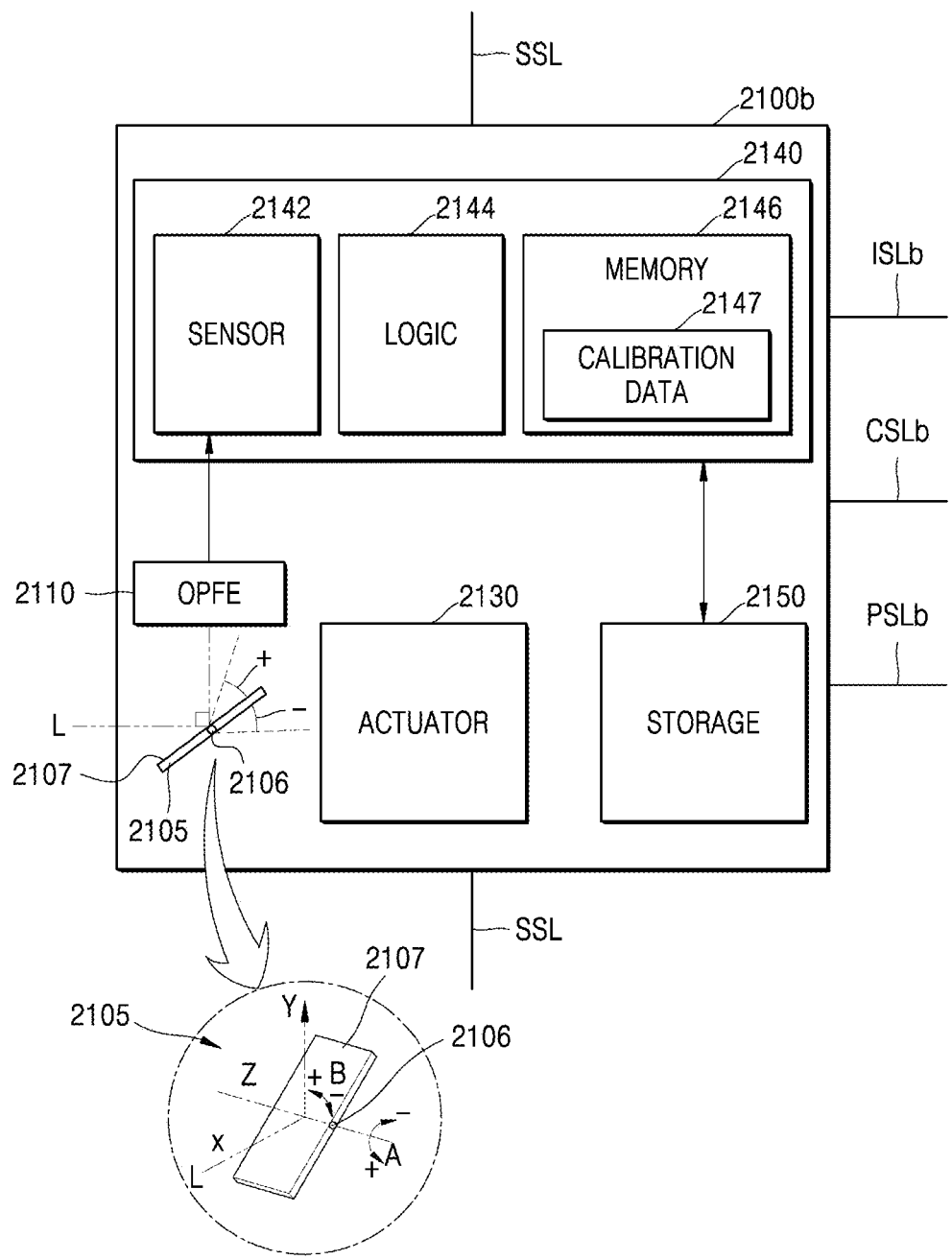
FIG. 14 is a diagram illustrating a specific configuration of a camera module according to example embodiments of the inventive concepts.

FIG. 13 is a diagram illustrating a part of an electronic device according to example embodiments of the inventive concepts. FIG. 14 is a diagram illustrating a concrete configuration of a camera module according to example embodiments of the inventive concepts. Specifically, FIG. 13 is a diagram illustrating an electronic device 2000 as part of the electronic device 1000 of FIG. 12, and FIG. 14 is a diagram illustrating a concrete configuration of the camera module 2100b of FIG. 13.

Referring to FIG. 13, the electronic device 2000 may include a multi-camera module 2100, an application processor 2200, and a memory 2300. The memory 2300 may perform the same function as the memory 1400 of FIG. 12 and thus a description of parts of the memory 2300 that are the same as those of the memory 1400 will be omitted.

The electronic device 2000 may capture and/or store an image of an object by using a CMOS image sensor, and may be embodied as a mobile phone, a tablet computer, or a portable electronic device. The portable electronic device may include a laptop computer, a mobile phone, a smartphone, a tablet PC, a wearable device, or the like.

The multi-camera module 2100 may include a first camera module 2100a, a second camera module 2100b, and a third camera module 2100c. The multi-camera module 2100 may perform the same function as the image sensor 100 of FIG. 1. Although FIG. 13 illustrates that the multi-camera module 2100 includes the three camera modules 2100a to 2100c, the inventive concepts are not limited thereto and a various number of camera modules may be included in the multi-camera module 2100.

A configuration of the camera module 2100b will be described in more detail with reference to FIG. 14 below but the following description may also apply to the other camera modules 2100a and 2100b according to example embodiments.

Referring to FIG. 14, the camera module 2100b may include a prism 2105, an optical path folding element (OPFE) 2110, an actuator 2130, an image sensing device 2140, and a memory 2150.

The prism 2105 may change a path of light L incident from the outside, including a reflective surface 2107 of a light reflective material.

In example embodiments, the prism 2105 may change a path of light incident in a first direction X to a second direction Y perpendicular to the first direction X. In addition, the prism 2105 may change the path of the light L incident in the first direction X to the second direction Y perpendicular to the first direction X by rotating the reflective surface 2107 of the light reflective material about a central axis 2106 in a direction A or rotating the central axis 2106 in a direction B. In some example embodiments, the OPFE 2110 may be moved in a third direction Z perpendicular to the first direction X and the second direction Y.

The OPFE 2110 may include, for example, m groups of optical lenses (here, m is natural number). The m groups of lenses may be moved in the second direction Y to change an optical zoom ratio of the camera module 2100b.

The actuator 2130 may move the OPFE 2110 or an optical lens (hereinafter referred to as an optical lens) to a certain position. For example, for accurate sensing, the actuator 2130 may adjust a position of the optical lens such that an image sensor 2142 is located at a focal length of the optical lens.

The image sensing device 2140 may include the image sensor 2142, a control logic 2144, and a memory 2146. The image sensor 2142 may sense an image of an object, which is to be sensed, by using light L provided through the optical lens. The image sensor 2142 of FIG. 14 may be similar in terms of functions to the image sensor 100 of FIG. 1 and thus a redundant description thereof will be omitted. The control logic 2144 may control overall operations of the second camera module 2100b.

The memory 2146 may store information, such as calibration data 2147, which is necessary to operate the second camera module 2100b. The calibration data 2147 may include information necessary for the second camera module 2100b to generate image data by using light L provided from the outside. The calibration data 2147 may include, for example, information regarding a degree of rotation, a focal length, an optical axis, and the like. When the second camera module 2100b is in the form of a multi-state camera in which a focal distance varies according to a position of the optical lens, the calibration data 2147 may include a focal distance value of each position (or each state) of the optical lens and information related to auto focusing.

The memory 2150 may store image data sensed through the image sensor 2142. The memory 2150 may be disposed outside the image sensing device 2140 and may be stacked together with a sensor chip of the image sensing device 2140. In example embodiments, the memory 2150 may be embodied as an electrically erasable programmable read-only memory (EEPROM) but example embodiments are not limited thereto.

Referring to FIGS. 13 and 14, in example embodiments, each of the plurality of camera modules 2100a, 2100b, and 2100c may include the actuator 2130. Accordingly, the plurality of camera modules 2100a, 2100b, and 2100c may include the same or different calibration data 2147 according to operations of the actuators 1130 therein.

In example embodiments, a camera module (e.g., the second camera module 2100b) among the plurality of camera modules 2100a, 2100b, and 2100c may be a folded lens type camera module that includes the prism 2105 and the OPFE 2110, and the other camera modules (e.g., the camera modules 2100a and 2100b) may be vertical camera modules that do not include the prism 2105 and the OPFE 2110, but example embodiments are not limited thereto.

In example embodiments, a camera module (e.g., the third camera module 2100c) among the plurality of camera modules 2100a, 2100b, and 2100c may be, for example, a vertical depth camera that extracts depth information by using infrared rays (IRs). In some example embodiments, the application processor 2200 may generate a three-dimensional (3D) depth image by merging image data provided from the depth camera and image data provided from another camera module (e.g., the first camera module 2100a or the second camera module 2100b).

In example embodiments, at least two camera modules (e.g., the first camera module 2100a and the second camera module 2100b) among the plurality of camera modules 2100a, 2100b, and 2100c may have different fields of view (FOV) (different viewing angles). In some example embodiments, for example, at least two camera modules (e.g., the camera modules 2100a and 2100b) among the plurality of camera modules 2100a, 2100b and 2100c may include different optical lenses but example embodiments are not limited thereto. For example, an FOV of the first camera module 2100a among the plurality of camera modules 2100a, 2100b, and 2100c may be less than those of the second and third camera modules 2100b and 2100c. However, example embodiments are not limited thereto, and the multi-camera module 2100 may further include a camera module having a greater FOV than those of the camera modules 2100a, 2100b, and 2100c that have been originally used.

In some example embodiments, viewing angles of the plurality of camera modules 2100a, 2100b, and 2100c may be different from one another. In some example embodiments, optical lenses included in the plurality of camera modules 2100a, 2100b, and 2100c may be different from one another but example embodiments are not limited thereto.

In some example embodiments, the plurality of camera modules 2100a, 2100b, and 2100c may be arranged to be physically separated from one another. That is, a sensing region of one image sensor 2142 is not divided and used by the plurality of camera modules 2100a, 2100b and 2100c but the image sensor 1142 may be independently provided in each of the plurality of camera modules 2100a, 2100b, and 2100c.

The application processor 2200 may include a plurality of subprocessors 2210a, 2210b, and 2210c, a camera module controller 2230, a memory controller 2400, and an internal memory 250. The application processor 1200 may be separated from the plurality of camera modules 2100a, 2100b, and 2100c. For example, the application processor 2200 and the plurality of camera modules 2100a, 2100b, and 2100c may be semiconductor chips separated from one another.

Image data generated by the camera module 2100a, image data generated by the camera module 2100b, and image data generated by the camera modules 2100c may be provided to the subprocessors 2210a, 2210b, and 2210c corresponding thereto through image signal lines ISLa, ISLb, and ISLc separated from one another. Such image data may be transmitted, for example, using a camera serial interface (CSI) based on a mobile industry processor interface (MIPI) but example embodiments are not limited thereto.

In example embodiments, one subprocessor may be arranged to correspond to a plurality of camera modules. For example, the first subprocessor 2210a and the third subprocessor 2210b may not be separated from each other unlike that illustrated in the drawings but be integrated together as one subprocessor, and image data provided from the camera modules 2100a and 2100c may be selected by a selector (e.g., a multiplexer) or the like and provided to the subprocessor.

The subprocessors 2210a, 2210b, and 2210c may perform image processing on received image data and output the processed image data to the image generator 2220.

The camera module controller 2230 may provide a control signal to the camera modules 2100a, 2100b and 2100c. The control signal generated by the camera module controller 2230 may be provided to the camera modules 2100a, 2100b, and 2100c through control signal lines CSLa, CSLb, and CSLc, which are separated from one another.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. An image sensor comprising:
   a pixel array including a plurality of pixel groups each including first pixels to which a first conversion gain is applied and second pixels to which a second conversion gain is applied;
   a readout circuit configured to receive a first pixel signal corresponding to the first pixels and a second pixel signal corresponding to the second pixels through a single readout with respect to each of the plurality of pixel groups, generate first image data based on first pixel signals of the plurality of pixel groups, and generate second image data based on second pixel signals of the plurality of pixel groups, the first image data being the first pixel signals converted into digital data, the second image data being the second pixel signals converted into digital data; and
   an image signal processor configured to generate output image data by merging the first image data and the second image data in units of a pixel group.

2. The image sensor of claim 1, wherein, with respect to each of the plurality of pixel groups, the first pixel signal is read out by summing first pixel values of the first pixels, and the second pixel signal is read out by summing second pixel values of the second pixels.

3. The image sensor of claim 1, wherein each of the first conversion gain and the second conversion gain is a high conversion gain or a low conversion gain.

4. The image sensor of claim 1, wherein each of the plurality of pixel groups comprises 2n first pixels and 2n second pixels, wherein n is a positive integer.

5. The image sensor of claim 4, wherein
   the first pixels of each of the plurality of pixel groups comprise red pixels, blue pixels, first green pixels, or second green pixels, and
   the second pixels of each of the plurality of pixel groups comprise white pixels or yellow pixels.

6. The image sensor of claim 4, wherein the first pixels and the second pixels of each of the plurality of pixel groups comprise red pixels, blue pixels, first green pixels, or second green pixels.

7. The image sensor of claim 1, wherein each of the plurality of pixel groups comprises third pixels to which a third conversion gain is applied.

8. The image sensor of claim 7, wherein the first pixels, the second pixels, and the third pixels of each of the plurality of pixel groups comprise red pixels, blue pixels, first green pixels, or second green pixels.

9. The image sensor of claim 7, wherein the readout circuit is further configured to, receive a third pixel signal corresponding to the third pixels to which the third conversion gain is applied through the single readout with respect to each of the plurality of pixel groups, and generate third image data, based on third pixel signals of the plurality of pixel groups.

10. The image sensor of claim 9, wherein the image signal processor is further configured to generate the output image data by merging the first image data, the second image data, and the third image data in units of pixel groups.

11. The image sensor of claim 1, wherein each of the plurality of pixel groups comprises third pixels to which a third conversion gain is applied and fourth pixels to which a fourth conversion gain is applied.

12. The image sensor of claim 11, wherein,
in each of the plurality of pixel groups, the first pixels are arranged at an upper left side of the corresponding pixel group,
in each of the plurality of pixel groups, the second pixels are arranged at an upper right side of the corresponding pixel group,
in each of the plurality of pixel groups, the third pixels are arranged at a lower left side of the corresponding pixel group, and
in each of the plurality of pixel groups, the fourth pixels are arranged in a lower right side of the corresponding pixel group.

13. The image sensor of claim 11, wherein the readout circuit is further configured to,
receive a third pixel signal corresponding to the third pixels and a fourth pixel signal corresponding to the fourth pixels through the single readout with respect to each of the plurality of pixel groups, and
generate third image data, based on third pixel signals of the plurality of pixel groups, and generates fourth image data, based on four pixel signals of the plurality of pixel groups sensor.

14. The image sensor of claim 13, wherein the image signal processor is further configured to generate the output image data by merging the first image data, the second image data, the third image data, and the fourth image data in units of pixel groups.

15. An electronic device comprising:
an image sensor in which a plurality of pixel groups each including a plurality of pixels are arranged, the image sensor being configured to generate a plurality of pixel signals corresponding to a plurality of conversion gains through a single readout with respect to each of the plurality of pixel groups, generate a plurality of pieces of image data corresponding to the plurality of pixel signals based on the plurality of pixel signals, the plurality of pieces of image data being the plurality of pixel signals converted into digital data, respectively, and generate output image data by merging the plurality of pieces of image data; and
a processor configured to perform image processing on the output image data.

16. The electronic device claim 15, wherein,
each of the plurality of pixel group comprises pixels corresponding to the plurality of conversion gains, and
the image sensor is further configured to generate a plurality of pixel signals corresponding to the plurality of conversion gains by summing pixel values of the pixels corresponding to the plurality of conversion gains with respect to each of the plurality of pixel groups.

17. The electronic device claim 15, wherein,
each of the plurality of pixel groups comprises,
first RGB pixels corresponding to a first conversion gain, and
white pixels corresponding to a second conversion gain, and
the image sensor is further configured to generate a first pixel signal corresponding to the first RGB pixels and a second pixel signal corresponding to the white pixels with respect to each of the plurality of pixel groups.

18. The electronic device claim 15, wherein,
each of the plurality of pixel groups comprises,
first RGB pixels corresponding to a first conversion gain, and
second RGB pixels corresponding to a second conversion gain, and
the image sensor is further configured to generate a first pixel signal corresponding to the first RGB pixels and a second pixel signal corresponding to the second RGB pixels with respect to each of the plurality of pixel groups.

19. The electronic device claim 15, wherein,
the image sensor is further configured to generate a first output image data corresponding to a first frame section and second output image data corresponding to a second frame section, and
the processor is further configured to generate multi-frame image data by merging the first output image data and the second output image data.

20. An operating method of an image sensor, the operating method comprising:
outputting a first pixel signal corresponding to first pixels corresponding to a first conversion gain through a single readout, from each of a plurality of pixel groups included in a pixel array;
outputting a second pixel signal corresponding to second pixels corresponding to a second conversion gain through the single readout, from each of the plurality of pixel groups included in the pixel array;
generating first image data based on first pixel signals of the plurality of pixel groups, the first image data being the first pixel signals converted into digital data;
generating second image data a based on second pixel signals of the plurality of pixel groups, the second image data being the second pixel signals converted into digital data; and
generating output image data by merging the first image data and the second image data in units of pixel groups.

21. The operating method of claim 20, wherein the outputting of the first pixel signal comprises outputting the first pixel signal by summing first pixel values of the first pixels, and
the outputting of the second pixel signal comprises the second pixel signal by summing second pixel values of the second pixels.

* * * * *